United States Patent
Nienstedt et al.

(10) Patent No.: US 11,625,090 B2
(45) Date of Patent: *Apr. 11, 2023

(54) VISUAL TRACKING OF PERIPHERAL DEVICES

(71) Applicant: Magic Leap, Inc., Plantation, FL (US)

(72) Inventors: Zachary C. Nienstedt, Fort Lauderdale, FL (US); Samuel A. Miller, Hollywood, FL (US); Barak Freedman, Binyamina (IL); Lionel Ernest Edwin, Hollywood, FL (US); Eric C. Browy, Meridian, ID (US); William Hudson Welch, Fort Lauderdale, FL (US); Ron Liraz Lidji, Haifa (IL)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,782

(22) Filed: Oct. 8, 2021

(65) Prior Publication Data

US 2022/0113792 A1 Apr. 14, 2022

Related U.S. Application Data

(63) Continuation of application No. 17/084,512, filed on Oct. 29, 2020, now Pat. No. 11,181,974, which is a (Continued)

(51) Int. Cl.
G06F 3/01 (2006.01)
G02B 27/01 (2006.01)
G06F 1/16 (2006.01)

(52) U.S. Cl.
CPC ............ *G06F 3/011* (2013.01); *G02B 27/017* (2013.01); *G06F 1/1686* (2013.01); *G06F 1/1694* (2013.01); *G02B 2027/0187* (2013.01)

(58) Field of Classification Search
CPC ...... G06F 3/011; G06F 1/1686; G06F 1/1694; G06F 1/163; G06F 3/0325; G06F 3/0346; (Continued)

(56) References Cited

U.S. PATENT DOCUMENTS 5,704,151 A 1/1998 West et al.
6,349,001 B1 2/2002 Spitzer
(Continued)

FOREIGN PATENT DOCUMENTS

CN 103105926 5/2013
CN 105934775 9/2016
(Continued)

OTHER PUBLICATIONS

Force Touch, Wikipedia, Available online at: https://en.wikipedia.org/wiki/Force_Touch, Accessed from Internet on Feb. 27, 2020, 6 pages.
(Continued)

*Primary Examiner* — Ibrahim A Khan
(74) *Attorney, Agent, or Firm* — Kilpatrick Townsend & Stockton LLP

(57) ABSTRACT

Techniques are disclosed for performing localization of a handheld device with respect to a wearable device. At least one sensor mounted to the handheld device, such as an inertial measurement unit (IMU), may obtain handheld data indicative of movement of the handheld device with respect to the world. An imaging device mounted to either the handheld device or the wearable device may capture a fiducial image containing a number of fiducials affixed to the other device. The number of fiducials contained in the image are determined. Based on the number of fiducials, at least one of a position and an orientation of the handheld device with respect to the wearable device are updated based on the image and the handheld data in accordance with a first operating state, a second operating state, or a third operating state.

17 Claims, 15 Drawing Sheets

Related U.S. Application Data continuation of application No. 16/588,830, filed on Sep. 30, 2019, now Pat. No. 10,860,090, which is a continuation of application No. PCT/US2019/021025, filed on Mar. 6, 2019.

(60) Provisional application No. 62/640,299, filed on Mar. 8, 2018, provisional application No. 62/640,009, filed on Mar. 7, 2018.

(58) Field of Classification Search
CPC ..... G06F 3/0383; G06F 30/00; G02B 27/017; G02B 2027/0187; G02B 27/01; A63F 13/213; A63F 13/25; A63F 13/65; A63F 2300/303
See application file for complete search history.

(56) References Cited

U.S. PATENT DOCUMENTS

| | | | |
|---|---|---|---|
| 6,757,068 | B2 | 6/2004 | Foxlin |
| 6,850,221 | B1 | 2/2005 | Tickle |
| 8,179,604 | B1 | 5/2012 | Prada Gomez et al. |
| 8,831,255 | B2 | 9/2014 | Crawford et al. |
| 8,950,867 | B2 | 2/2015 | Macnamara |
| 8,957,835 | B2 | 2/2015 | Hoellwarth |
| 9,081,426 | B2 | 7/2015 | Armstrong |
| 9,163,933 | B1 | 10/2015 | Olen |
| 9,182,594 | B2 | 11/2015 | Hino et al. |
| 9,215,293 | B2 | 12/2015 | Miller |
| 9,310,559 | B2 | 4/2016 | Macnamara |
| 9,348,143 | B2 | 5/2016 | Gao et al. |
| D758,367 | S | 6/2016 | Natsume |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,557,566 | B2 | 1/2017 | Fujimaki |
| 9,630,105 | B2 | 4/2017 | Stafford |
| 9,671,566 | B2 | 6/2017 | Abovitz et al. |
| 9,740,006 | B2 | 8/2017 | Gao |
| D797,743 | S | 9/2017 | Awad et al. |
| 9,774,979 | B1 | 9/2017 | Morishita et al. |
| 9,791,700 | B2 | 10/2017 | Schowengerdt |
| 9,851,563 | B2 | 12/2017 | Gao et al. |
| 9,857,591 | B2 | 1/2018 | Welch et al. |
| 9,874,749 | B2 | 1/2018 | Bradski et al. |
| 9,897,805 | B2 * | 2/2018 | Stafford .................. G06F 3/011 |
| 9,908,048 | B2 | 3/2018 | Osman et al. |
| 9,987,554 | B2 | 6/2018 | Stafford et al. |
| 10,019,057 | B2 | 7/2018 | Osman et al. |
| 10,031,576 | B2 * | 7/2018 | Cunningham .......... G06F 3/013 |
| 10,102,627 | B2 | 10/2018 | Tsuda et al. |
| 10,152,141 | B1 * | 12/2018 | Lohse ..................... G06F 3/014 |
| 10,325,411 | B1 * | 6/2019 | Laney ..................... G01C 21/20 |
| 10,373,342 | B1 * | 8/2019 | Perez, III ............. G02B 27/017 |
| 10,535,199 | B1 * | 1/2020 | Bond ....................... G06T 15/08 |
| 10,747,301 | B2 | 8/2020 | Shipes et al. |
| 10,860,090 | B2 | 12/2020 | Nienstedt et al. |
| 11,181,974 | B2 | 11/2021 | Nienstedt et al. |
| 2001/0055397 | A1 | 12/2001 | Norris et al. |
| 2004/0247140 | A1 | 12/2004 | Norris et al. |
| 2005/0174470 | A1 | 8/2005 | Yamasaki |
| 2005/0195277 | A1 | 9/2005 | Yamasaki |
| 2005/0248852 | A1 | 11/2005 | Yamasaki |
| 2006/0181521 | A1 | 8/2006 | Perreault et al. |
| 2007/0029899 | A1 | 2/2007 | Matsuzawa |
| 2007/0291949 | A1 | 12/2007 | Imaki |
| 2008/0036744 | A1 | 2/2008 | Hartl |
| 2008/0297437 | A1 | 12/2008 | Takahashi |
| 2009/0002218 | A1 | 1/2009 | Rigazio et al. |
| 2009/0090568 | A1 | 4/2009 | Min |
| 2009/0209343 | A1 | 8/2009 | Foxlin et al. |
| 2009/0299686 | A1 | 12/2009 | Ho |
| 2009/0310802 | A1 | 12/2009 | Zhang et al. |
| 2010/0020070 | A1 | 1/2010 | Hart et al. |
| 2010/0020229 | A1 | 1/2010 | Hershey et al. |
| 2010/0033427 | A1 | 2/2010 | Marks et al. |
| 2010/0079356 | A1 | 4/2010 | Hoellwarth |
| 2010/0144436 | A1 | 6/2010 | Marks et al. |
| 2010/0194687 | A1 | 8/2010 | Corson et al. |
| 2011/0194029 | A1 | 8/2011 | Herrmann et al. |
| 2011/0221656 | A1 | 9/2011 | Haddick et al. |
| 2011/0231757 | A1 | 9/2011 | Haddick et al. |
| 2012/0127062 | A1 | 5/2012 | Bar-Zeev et al. |
| 2012/0157201 | A1 | 6/2012 | Mizutani et al. |
| 2012/0242560 | A1 | 9/2012 | Nakada et al. |
| 2013/0082922 | A1 | 4/2013 | Miller |
| 2013/0083018 | A1 * | 4/2013 | Geisner .................. G06F 3/011 345/633 |
| 2013/0104085 | A1 | 4/2013 | Mlyniec et al. |
| 2013/0117377 | A1 * | 5/2013 | Miller ..................... A63F 13/35 709/205 |
| 2013/0125027 | A1 | 5/2013 | Abovitz |
| 2013/0182064 | A1 | 7/2013 | Muench |
| 2013/0217488 | A1 | 8/2013 | Comsa |
| 2013/0236040 | A1 | 9/2013 | Crawford et al. |
| 2013/0328762 | A1 | 12/2013 | McCulloch et al. |
| 2013/0335573 | A1 | 12/2013 | Forutanpour et al. |
| 2014/0006026 | A1 | 1/2014 | Lamb et al. |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0306866 | A1 | 10/2014 | Miller et al. |
| 2014/0320531 | A1 | 10/2014 | Elvesjo |
| 2014/0328505 | A1 | 11/2014 | Heinemann et al. |
| 2014/0361977 | A1 | 12/2014 | Stafford et al. |
| 2014/0362110 | A1 | 12/2014 | Stafford |
| 2015/0022444 | A1 | 1/2015 | Ooi |
| 2015/0067580 | A1 | 3/2015 | Um et al. |
| 2015/0103306 | A1 | 4/2015 | Kaji et al. |
| 2015/0138065 | A1 | 5/2015 | Alfieri |
| 2015/0138101 | A1 | 5/2015 | Park et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0234192 | A1 | 8/2015 | Lyons |
| 2015/0234501 | A1 | 8/2015 | Lyons |
| 2015/0235426 | A1 | 8/2015 | Lyons |
| 2015/0258432 | A1 * | 9/2015 | Stafford ................ A63F 13/426 463/32 |
| 2015/0261291 | A1 * | 9/2015 | Mikhailov ......... G02B 27/0093 345/156 |
| 2015/0268415 | A1 | 9/2015 | Schowengerdt et al. |
| 2015/0283460 | A1 | 10/2015 | Huang et al. |
| 2015/0301592 | A1 | 10/2015 | Miller |
| 2015/0301787 | A1 | 10/2015 | Greco et al. |
| 2015/0302652 | A1 | 10/2015 | Miller et al. |
| 2015/0317833 | A1 | 11/2015 | Ebstyne et al. |
| 2015/0319530 | A1 | 11/2015 | Virolainen et al. |
| 2015/0326570 | A1 | 11/2015 | Publicover et al. |
| 2015/0346490 | A1 | 12/2015 | Tekolste et al. |
| 2015/0346495 | A1 | 12/2015 | Welch et al. |
| 2015/0348328 | A1 | 12/2015 | Tsuda et al. |
| 2015/0352437 | A1 | 12/2015 | Koseki et al. |
| 2015/0355811 | A1 | 12/2015 | Ybanez Zepeda |
| 2015/0379349 | A1 | 12/2015 | Gomez et al. |
| 2015/0382130 | A1 | 12/2015 | Connor et al. |
| 2015/0382131 | A1 | 12/2015 | Kuehne et al. |
| 2016/0011419 | A1 | 1/2016 | Gao |
| 2016/0026253 | A1 * | 1/2016 | Bradski ................ H04N 13/128 345/8 |
| 2016/0035140 | A1 | 2/2016 | Bickerstaff et al. |
| 2016/0062489 | A1 | 3/2016 | Li |
| 2016/0085302 | A1 | 3/2016 | Publicover et al. |
| 2016/0093105 | A1 | 3/2016 | Rimon et al. |
| 2016/0140764 | A1 | 5/2016 | Bickerstaff et al. |
| 2016/0187970 | A1 | 6/2016 | Ashforth et al. |
| 2016/0206957 | A1 | 7/2016 | Goslin et al. |
| 2016/0212272 | A1 | 7/2016 | Srinivasan et al. |
| 2016/0225156 | A1 * | 8/2016 | Ikenoue .................... G06T 7/73 |
| 2016/0227338 | A1 | 8/2016 | Oh et al. |
| 2016/0259404 | A1 * | 9/2016 | Woods .................. G06F 3/0346 |
| 2016/0277891 | A1 | 9/2016 | Dvortsov et al. |

(56) References Cited

U.S. PATENT DOCUMENTS

| | | | |
|---|---|---|---|
| 2016/0320847 | A1 | 11/2016 | Coleman et al. |
| 2016/0378204 | A1* | 12/2016 | Chen .................. G06V 20/20 345/156 |
| 2017/0039774 | A1 | 2/2017 | Estable |
| 2017/0076503 | A1 | 3/2017 | Tamaoki et al. |
| 2017/0078825 | A1 | 3/2017 | Mangiat et al. |
| 2017/0182957 | A1 | 6/2017 | Watson et al. |
| 2017/0249745 | A1 | 8/2017 | Fiala |
| 2017/0307889 | A1* | 10/2017 | Newman .................. G06F 3/017 |
| 2017/0307891 | A1* | 10/2017 | Bucknor ............ G02B 27/0093 |
| 2017/0351094 | A1* | 12/2017 | Poulos .................. G02B 27/017 |
| 2017/0354864 | A1 | 12/2017 | Rogers et al. |
| 2017/0357333 | A1 | 12/2017 | Balan et al. |
| 2017/0357334 | A1 | 12/2017 | Balan et al. |
| 2018/0003981 | A1 | 1/2018 | Urey |
| 2018/0004308 | A1 | 1/2018 | McCulloch et al. |
| 2018/0047202 | A1 | 2/2018 | Long et al. |
| 2018/0053284 | A1 | 2/2018 | Rodriguez et al. |
| 2018/0091304 | A1 | 3/2018 | Brook et al. |
| 2018/0097975 | A1* | 4/2018 | Osman .................. H04N 5/2226 |
| 2018/0120936 | A1* | 5/2018 | Keller ................. G02B 27/0172 |
| 2018/0150131 | A1 | 5/2018 | Ranieri et al. |
| 2018/0180448 | A1 | 6/2018 | Miller et al. |
| 2018/0249274 | A1 | 8/2018 | Lyren et al. |
| 2018/0284882 | A1 | 10/2018 | Shipes et al. |
| 2018/0293752 | A1* | 10/2018 | Ninan .................. G06T 7/70 |
| 2018/0314406 | A1 | 11/2018 | Powderly et al. |
| 2018/0314416 | A1 | 11/2018 | Powderly et al. |
| 2018/0330521 | A1* | 11/2018 | Samples ................. A63F 13/31 |
| 2019/0019520 | A1 | 1/2019 | Berthet |
| 2019/0025681 | A1 | 1/2019 | Ida et al. |
| 2019/0034155 | A1 | 1/2019 | Ida et al. |
| 2019/0043238 | A1 | 2/2019 | Benishti et al. |
| 2019/0170510 | A1* | 6/2019 | Robinson ................ G06F 3/011 |
| 2019/0182415 | A1 | 6/2019 | Sivan |
| 2019/0325274 | A1* | 10/2019 | Balan .................... G06F 3/011 |
| 2019/0347865 | A1* | 11/2019 | Hackett .................. G06T 13/20 |
| 2020/0026348 | A1 | 1/2020 | Nienstedt et al. |
| 2020/0037091 | A1 | 1/2020 | Jeon et al. |

FOREIGN PATENT DOCUMENTS

| | | |
|---|---|---|
| CN | 106815859 | 6/2017 |
| CN | 107646098 | 1/2018 |
| CN | 107767450 | 3/2018 |
| JP | 2008521136 A | 6/2008 |
| JP | 2008541222 A | 11/2008 |
| JP | 2010015535 A | 1/2010 |
| JP | 2011024613 A | 2/2011 |
| JP | 2013515999 A | 5/2013 |
| JP | 2013161267 A | 8/2013 |
| JP | 2015072582 A | 4/2015 |
| JP | 2016527536 | 9/2016 |
| JP | 2017511082 | 4/2017 |
| JP | 2017529635 | 10/2017 |
| KR | 20160005720 A | 1/2016 |
| KR | 20160066451 | 6/2016 |
| KR | 101651535 | 9/2016 |
| WO | 2011078926 A1 | 6/2011 |
| WO | 2014188798 | 11/2014 |
| WO | 2014199154 | 12/2014 |
| WO | 2015123771 | 8/2015 |
| WO | 2016061196 A2 | 4/2016 |
| WO | 2016104922 | 6/2016 |
| WO | 2017007637 | 1/2017 |
| WO | 2017048519 A1 | 3/2017 |
| WO | 2018183390 | 10/2018 |
| WO | 2018201067 | 11/2018 |
| WO | 2019173524 | 9/2019 |

OTHER PUBLICATIONS

U.S. Appl. No. 15/937,721, Applicant-initiated Interview Summary dated Mar. 5, 2020, 3 pages.
U.S. Appl. No. 15/937,721, Notice of Allowance dated Apr. 9, 2020, 15 pages.
U.S. Appl. No. 15/956,696, Office Action dated Mar. 2, 2020, 19 pages.
U.S. Appl. No. 15/965,702, Advisory Action dated Mar. 9, 2020, 4 pages.
U.S. Appl. No. 15/965,702, Applicant-initiated Interview Summary dated Feb. 25, 2020, 3 pages.
U.S. Appl. No. 15/965,702, Office Action dated May 12, 2020, 32 pages.
U.S. Appl. No. 16/588,830, Notice of Allowance dated Jul. 28, 2020, 10 pages.
U.S. Appl. No. 16/588,830, Notice of Allowance dated Sep. 23, 2020, 10 pages.
U.S. Appl. No. 15/965,702 Notice of Allowance dated Sep. 23, 2020, 14 pages.
U.S. Appl. No. 17/084,512, Notice of Allowance dated Jul. 9, 2021, 11 pages.
Australian Application No. 2019231697, First Examination Report dated Oct. 8, 2019, 2 pages.
Australian Application No. 2019231697, Notice of Acceptance dated Jan. 16, 2020, 3 pages.
Australian Application No. 2020202820, Notice of Acceptance dated Oct. 1, 2020, 3 pages.
Bensch, Toward Real-Time Video-Enhanced Augmented Reality for Medical Visualization and Simulation, Thesis. Rochester Institute of Technology, Nov. 2015, 108 pages.
Canadian Application No. 3,059,064, Office Action dated Feb. 4, 2021, 3 pages.
Canadian Application No. 3,059,064, Office Action dated Aug. 21, 2020, 5 pages.
Chinese Application No. 201980001863.1, Office Action dated May 29, 2020, 14 pages (8 pages of Original Document and 6 pages of English Translation).
Chinese Application No. 201980001863.1, Office Action dated Nov. 23, 2020, 20 pages (10 pages of Original Document and 10 pages of English Translation).
European Application No. 19765119.3, Extended European Search Report dated Feb. 14, 2020, 9 pages.
European Application No. 19765119.3, Office Action dated Dec. 16, 2020, 8 pages.
European Application No. 19765119.3, Summons to Attend Oral Proceedings mailed on Jul. 22, 2021, 10 pages.
Israel Application No. 269587, Office Action dated Oct. 14, 2020, 12 pages (6 pages of Original Document and 6 pages of English Translation).
Japanese Application No. 2019-558710, Office Action dated Jun. 29, 2020, 9 pages (3 pages of Original Document and 6 pages of English Translation).
Korean Application No. 10-2020-7016433, Office Action dated Mar. 5, 2021, 12 pages (6 pages of Original Document and 6 pages of English Translation).
Nilsson, Another Touch Screen Technology Tips Up, SemiAccurate, Available online at http://semiaccurate.com/2009/12/30/newtoucl1screentechnoiogytips/, Dec. 30, 2009, 4 pages.
New Zealand Application No. 757418, First Examination Report dated Nov. 22, 2019, 2 pages.
International Application No. PCT/US2018/024658, International Search Report and Written Opinion dated Jun. 21, 2018, 14 pages.
International Application No. PCT/US2018/29988, International Preliminary Report on Patentability dated Oct. 29, 2019, 8 pages.
International Application No. PCT/US2018/29988, International Search Report and Written Opinion dated Aug. 30, 2018, 12 pages.
International Application No. PCT/US2019/021025, International Preliminary Report on Patentability dated Sep. 17, 2020, 10 pages.
International Application No. PCT/US2019/021025, International Search Report and Written Opinion dated Jun. 3, 2019, 11 pages.
U.S. Appl. No. 17/384,663, Office Action, dated Apr. 1, 2022, 17 pages.
Application No. AU2018244316, "First Examination Report", dated Feb. 18, 2022, 2 pages.
Application No. EP18777770.1, Office Action, dated Mar. 17, 2022, 11 pages.

(56) References Cited

OTHER PUBLICATIONS

Application No. IL269533, Office Action, dated Nov. 23, 2021, 6 pages.
Application No. IN201947037494, "First Examination Report", dated Apr. 29, 2022, 5 pages.
Application No. IN201947037495, "First Examination Report", dated Feb. 9, 2022, 8 pages.
Application No. IN201947043607, "First Examination Report", dated Feb. 23, 2022, 9 pages.
Application No. JP2019-552859, Office Action and English Translation, dated Mar. 3, 2022, 9 pages.
Application No. JP2019-556946, Office Action and English Translation, dated Mar. 28, 2022, 11 pages.
Application No. KR10-2019-7034642, Office Action, dated Apr. 14, 2022, 4 pages [no translation available].
U.S. Appl. No. 17/384,663, "Final Office Action", dated Aug. 12, 2022, 25 pages.
Canadian Application No. CA 3,139,648 , "Office Action", dated Jan. 10, 2023, 5 pages.

* cited by examiner

VISUAL TRACKING OF PERIPHERAL DEVICES

CROSS-REFERENCES TO RELATED APPLICATIONS

This application is a continuation of U.S. patent application Ser. No. 17/084,512, filed Oct. 29, 2020, U.S. Pat. No. 11,181,974, issued Nov. 23, 2021, entitled "VISUAL TRACKING OF PERIPHERAL DEVICES," which is a continuation of U.S. patent application Ser. No. 16/588,830, filed Sep. 30, 2019, U.S. Pat. No. 10,860,090, issued Dec. 8, 2020, entitled "VISUAL TRACKING OF PERIPHERAL DEVICES," which is a continuation of International Patent Application No. PCT/US2019/021025, filed Mar. 6, 2019, entitled "VISUAL TRACKING OF PERIPHERAL DEVICES," which claims the benefit of and priority to U.S. Provisional Patent Application No. 62/640,299, filed Mar. 8, 2018, entitled "VISUAL TRACKING OF PERIPHERAL DEVICES" and to U.S. Provisional Patent Application No. 62/640,009, filed Mar. 7, 2018, entitled "VISUAL TRACKING OF PERIPHERAL DEVICES," the entire disclosures of which are hereby incorporated by reference, for all purposes, as if fully set forth herein.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present invention relates generally to localization (position, orientation, and/or distance) of a peripheral device. More particularly, embodiments of the present invention provide systems, devices, and methods for localization of a handheld device with respect to a wearable device. Although portions of the present disclosure are described in reference to an augmented reality (AR) system, the disclosure is applicable to a variety of applications.

In accordance with a first aspect of the present invention, a method of performing localization of a handheld device with respect to a wearable device is provided. The method may include obtaining, by at least one sensor mounted to the handheld device, handheld data indicative of movement of the handheld device with respect to the world. In some embodiments, obtaining the handheld data includes detecting, by an inertial measurement unit (IMU) mounted to the handheld device, linear accelerations and rotational velocities of the handheld device. In some embodiments, obtaining the handheld data includes capturing, by a handheld camera mounted to the handheld device, a world image containing one or more features surrounding the handheld device. The method may further include obtaining, by a wearable camera mounted to the wearable device, fiducial data indicative of movement of the handheld device with respect to the wearable device. In some embodiments, obtaining the fiducial data includes capturing, by the wearable camera, a fiducial image containing a number of light-emitting diodes (LEDs) affixed to the handheld device of a plurality of LEDs affixed to the handheld device.

The method may further include determining the number of LEDs contained in the fiducial image. The method may further include in response to determining that the number of LEDs is equal to or greater than three, updating the position and the orientation of the handheld device with respect to the wearable device based solely on the fiducial data in accordance with a first operating state. The method may further include in response to determining that the number of LEDs is equal to one or two, updating the position and the orientation of the handheld device with respect to the wearable device based on the fiducial data and the handheld data in accordance with a second operating state. The method may further include in response to determining that the number of LEDs is equal to zero, updating the position and the orientation of the handheld device with respect to the wearable device based solely on the handheld data in accordance with a third operating state.

In accordance with a second aspect of the present invention, a method of performing localization of a handheld device with respect to a wearable device. The method may include obtaining, by at least one sensor mounted to the handheld device, handheld data indicative of movement of the handheld device with respect to the world. The method may also include obtaining, by an imaging device mounted to a first device, fiducial data indicative of movement of the handheld device with respect to the wearable device. In some embodiments, the first device is either the handheld device or the wearable device. In some embodiments, obtaining the fiducial data includes capturing, by the imaging device, a fiducial image containing a number of fiducials affixed to a second device different than the first device. In some embodiments, the second device is either the handheld device or the wearable device. The method may further include determining the number of fiducials contained in the fiducial image. The method may further include based on the number of fiducials contained in the fiducial image, updating a position and an orientation of the handheld device with respect to the wearable device based on the fiducial data and the handheld data in accordance with a first operating state or a second operating state.

In some embodiments, obtaining the handheld data includes detecting, by an IMU mounted to the handheld device, rotational movement of the handheld device. In some embodiments, the imaging device is mounted to the handheld device and a plurality of fiducials including the number of fiducials are affixed to the wearable device. In some embodiments, the imaging device is mounted to the wearable device and a plurality of fiducials including the number of fiducials are affixed to the handheld device. In some embodiments, the imaging device is mounted to the handheld device and a plurality of fiducials including the number of fiducials are affixed to the wearable device. In some embodiments, obtaining the handheld data includes capturing, by a second handheld imaging device mounted to the handheld device, a world image containing one or more features surrounding the handheld device. In some embodiments, the imaging device is mounted to the wearable device and a single fiducial including the number of fiducials is affixed to the handheld device. In such embodiments, obtaining the handheld data includes capturing, by a second handheld imaging device mounted to the handheld device, a world image containing one or more features surrounding the handheld device.

In some embodiments, the imaging device is mounted to the wearable device and a plurality of fiducials including the number of fiducials are affixed to the handheld device. In such embodiments, obtaining the handheld data includes capturing, by a second handheld imaging device mounted to the handheld device, a world image containing one or more features surrounding the handheld device. The method may further include in response to determining that the number of fiducials is equal to or greater than three, updating the position and the orientation of the handheld device with respect to the wearable device based on the fiducial data in accordance with a first operating state. The method may further include in response to determining that the number of fiducials is equal to one or two, updating the position and the orientation of the handheld device with respect to the wearable device based on the fiducial data and the handheld data in accordance with a second operating state. The method may further include in response to determining that the number of fiducials is equal to zero, updating the position and the orientation of the handheld device with respect to the wearable device based on the handheld data in accordance with a third operating state. In some embodiments, the position and the orientation of the handheld device with respect to the wearable device is updated based solely on the fiducial data in accordance with the first operating state. In some embodiments, the position and the orientation of the handheld device with respect to the wearable device is updated based solely on the handheld data in accordance with the third operating state.

In accordance with a third aspect of the present invention, a system for performing localization of a handheld device with respect to a wearable device is provided. The system may include the wearable device. The system may also include the handheld device. The system may further include one or more processors communicatively coupled to the wearable device and the handheld device. In some embodiments, the one or more processors are configured to perform operations including obtaining, by at least one sensor mounted to the handheld device, handheld data indicative of movement of the handheld device with respect to the world. The operations may also include obtaining, by an imaging device mounted to a first device, fiducial data indicative of movement of the handheld device with respect to the wearable device. In some embodiments, the first device is either the handheld device or the wearable device. In some embodiments, obtaining the fiducial data includes capturing, by the imaging device, a fiducial image containing a number of fiducials affixed to a second device different than the first device. In some embodiments, the second device is either the handheld device or the wearable device. The operations may further include determining the number of fiducials contained in the fiducial image. The operations may further include based on the number of fiducials contained in the fiducial image, updating a position and an orientation of the handheld device with respect to the wearable device based on the fiducial data and the handheld data in accordance with a first operating state or a second operating state.

In some embodiments, obtaining the handheld data includes detecting, by an IMU mounted to the handheld device, rotational movement of the handheld device. In some embodiments, the imaging device is mounted to the handheld device and a plurality of fiducials including the number of fiducials are affixed to the wearable device. In some embodiments, the imaging device is mounted to the wearable device and a plurality of fiducials including the number of fiducials are affixed to the handheld device. In some embodiments, the imaging device is mounted to the handheld device and a plurality of fiducials including the number of fiducials are affixed to the wearable device. In such embodiments, obtaining the handheld data includes capturing, by a second handheld imaging device mounted to the handheld device, a world image containing one or more features surrounding the handheld device. In some embodiments, the imaging device is mounted to the wearable device and a single fiducial including the number of fiducials is affixed to the handheld device. In such embodiments, obtaining the handheld data includes capturing, by a second handheld imaging device mounted to the handheld device, a world image containing one or more features surrounding the handheld device. In some embodiments, the imaging device is mounted to the wearable device and a plurality of fiducials including the number of fiducials are affixed to the handheld device. In such embodiments, obtaining the handheld data includes capturing, by a second handheld imaging device mounted to the handheld device, a world image containing one or more features surrounding the handheld device.

In some embodiments, the operations further include in response to determining that the number of fiducials is equal to or greater than three, updating the position and the orientation of the handheld device with respect to the wearable device based on the fiducial data in accordance with a first operating state. In some embodiments, the operations further include in response to determining that the number of fiducials is equal to one or two, updating the position and the orientation of the handheld device with respect to the wearable device based on the fiducial data and the handheld data in accordance with a second operating state. In some embodiments, the operations further include in response to determining that the number of fiducials is equal to zero, updating the position and the orientation of the handheld device with respect to the wearable device based on the handheld data in accordance with a third operating state.

Numerous benefits are achieved by way of the present invention over conventional techniques. For example, embodiments of the present invention offer higher accuracy localization of a handheld device than conventional techniques, such as electromagnetic tracking systems which employ a series of magnetic coils. Embodiments of the present invention may also make use of hardware already being utilized by an AR system, such as the front-facing or side-facing world cameras equipped on the head set. Embodiments may extend beyond AR systems and into any application where localization of one device with respect to another device is important. Other benefits of the present invention will be readily apparent to those skilled in the art.

DETAILED DESCRIPTION OF SPECIFIC EMBODIMENTS

In conventional virtual reality (VR) or augmented reality (AR) systems, six degrees of freedom tracking of a peripheral device is achieved by incorporating a series of electromagnetic sensors and emitters that are strategically placed on the user's AR headset, belt pack, and/or other ancillary devices (e.g., totems, haptic devices, gaming instruments, etc.). Typically, electromagnetic tracking systems include at least one electromagnetic field emitter and at least one electromagnetic field sensor. Because the emitted electromagnetic fields have a known distribution, the detected fields may be analyzed to determine a position and/or orientation of the peripheral device. Although such systems offer a simple solution to the localization problem, there is a need for additional solutions that offer higher accuracy localization. Embodiments of the present invention can replace or supplement electromagnetic tracking systems.

Embodiments of the present invention provide a visual tracking system for performing high-accuracy localization of a handheld device (e.g., a totem) with respect to a wearable device (e.g., a head set). An imaging device is mounted to one of the devices and may capture an image of one or more fiducials affixed to the other device. An additional imaging device may be mounted to the handheld device for capturing various environmental markers. Based on the number of fiducials in the captured image, different data processing schemes may be implemented that utilize fiducial data (i.e., data based on the fiducial image having a local reference) and handheld data (data gathered from sensors mounted to the handheld device having a world reference) differently. Each data processing scheme, referred to herein as an operating state, may enable accurate estimation of the position and/or orientation of the handheld device with respect to the wearable device. The tracking system may inform the AR system of the estimated localization, and the AR system may use the localization information to generate virtual content that feels comfortable to the user.

Figure 1:
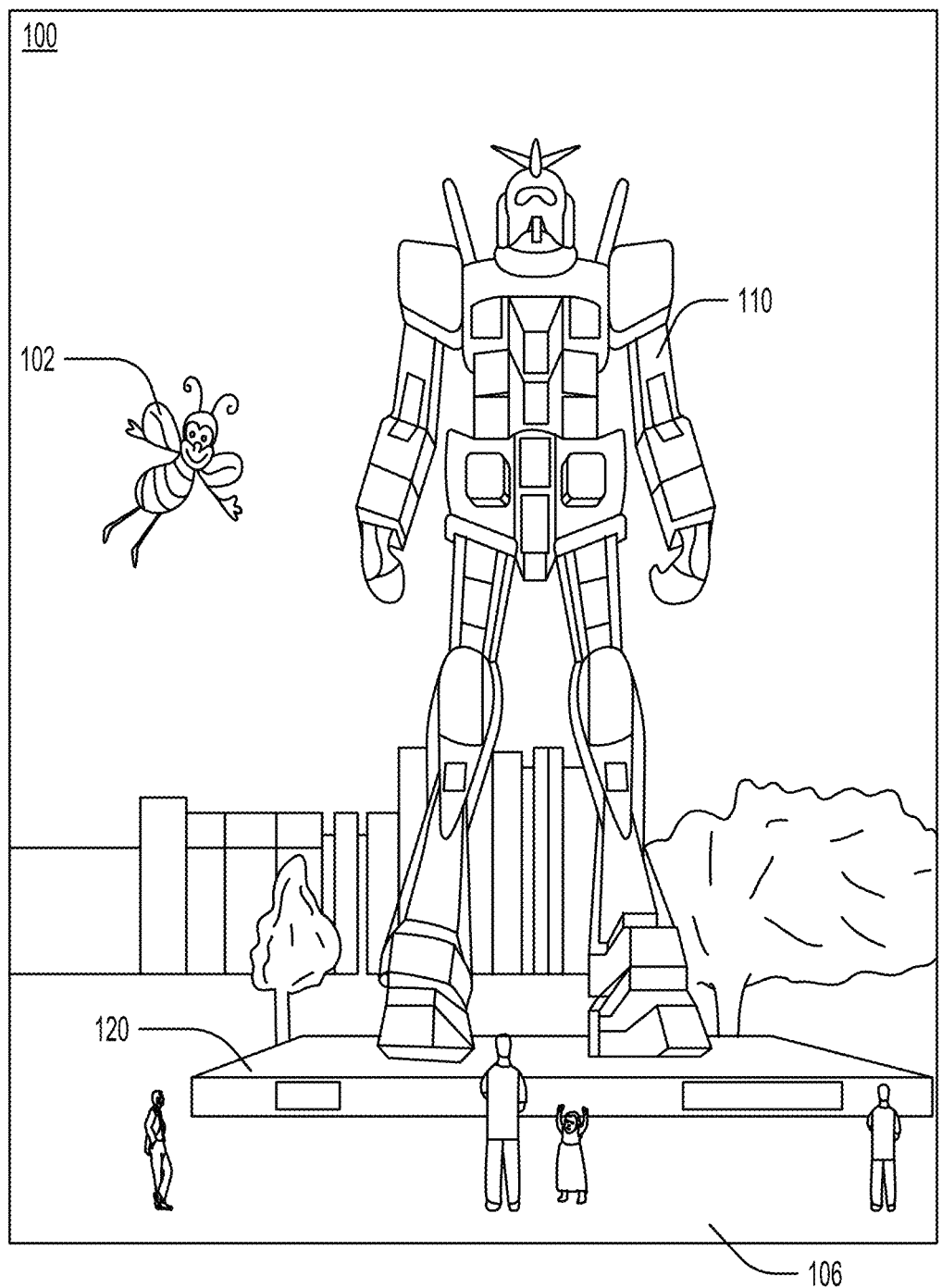
FIG. 1 illustrates an augmented reality (AR) scene as viewed through a wearable AR device according to an embodiment described herein.

FIG. 1 illustrates an AR scene as viewed through a wearable AR device according to an embodiment described herein. An AR scene 100 is depicted wherein a user of an AR technology sees a real-world park-like setting 106 featuring people, trees, buildings in the background, and a concrete platform 120. In addition to these items, the user of the AR technology also perceives that he "sees" a robot statue 110 standing upon the real-world platform 120, and a cartoon-like avatar character 102 flying by, which seems to be a personification of a bumble bee, even though these elements (character 102 and statue 110) do not exist in the real world. Due to the extreme complexity of the human visual perception and nervous system, it is challenging to produce a VR or AR technology that facilitates a comfortable, natural-feeling, rich presentation of virtual image elements amongst other virtual or real-world imagery elements.

Figure 2:
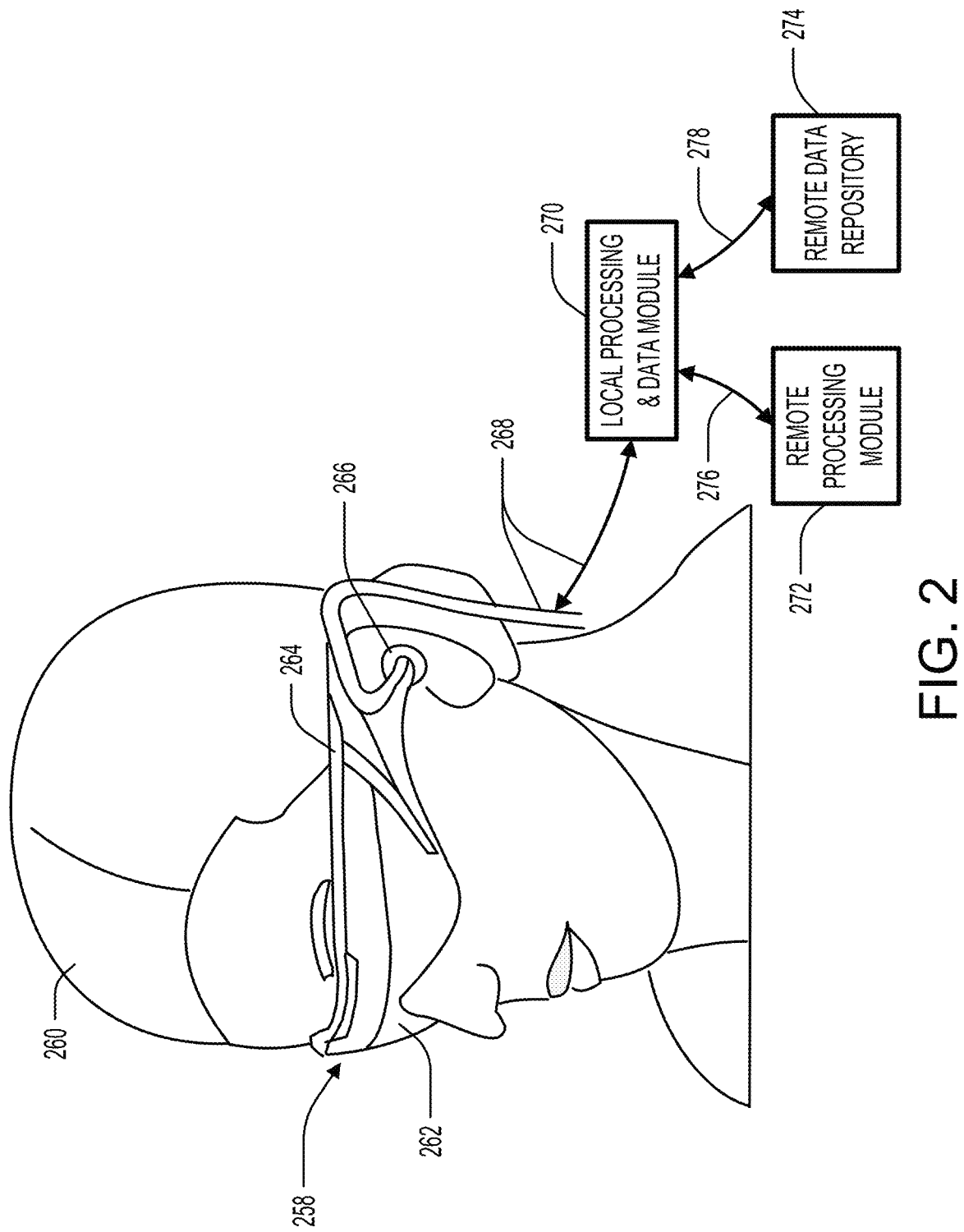
FIG. 2 illustrates various possible components of an AR system.

FIG. 2 illustrates various possible components of an AR system. In the illustrated embodiment, an AR system user 260 is depicted wearing a head mounted component 258 featuring a frame 264 structure coupled to a display system 262 positioned in front of the eyes of the user. A speaker 266 is coupled to frame 264 in the depicted configuration and is positioned adjacent the ear canal of the user (in one embodiment, another speaker, not shown, is positioned adjacent the other ear canal of the user to provide for stereo/shapeable sound control). Display 262 is operatively coupled (as indicated by 268), such as by a wired lead or wireless connectivity, to a local processing and data module 270 which may be mounted in a variety of configurations, such as fixedly attached to frame 264, fixedly attached to a helmet or hat, removably attached to the torso of user 260 in a backpack-style configuration, or removably attached to the hip of user 260 in a belt-coupling style configuration.

Local processing and data module 270 may comprise a power-efficient processor or controller, as well as digital memory, such as flash memory, both of which may be utilized to assist in the processing, caching, and storage of data a) captured from sensors which may be operatively coupled to frame 264, such as image capture devices (such as cameras), microphones, inertial measurement units, accelerometers, compasses, GPS units, radio devices, and/or gyroscopes; and/or b) acquired and/or processed using remote processing module 272 and/or remote data repository 274, possibly for passage to display 262 after such processing or retrieval.

Local processing and data module 270 may be operatively coupled (as indicated by 276, 278), such as via wired or wireless communication links, to remote processing module 272 and remote data repository 274 such that these remote modules 272, 274 are operatively coupled to each other and available as resources to local processing and data module 270. In one embodiment, remote processing module 272 may comprise one or more relatively powerful processors or controllers configured to analyze and process data and/or image information. In one embodiment, remote data repository 274 may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Figure 3:
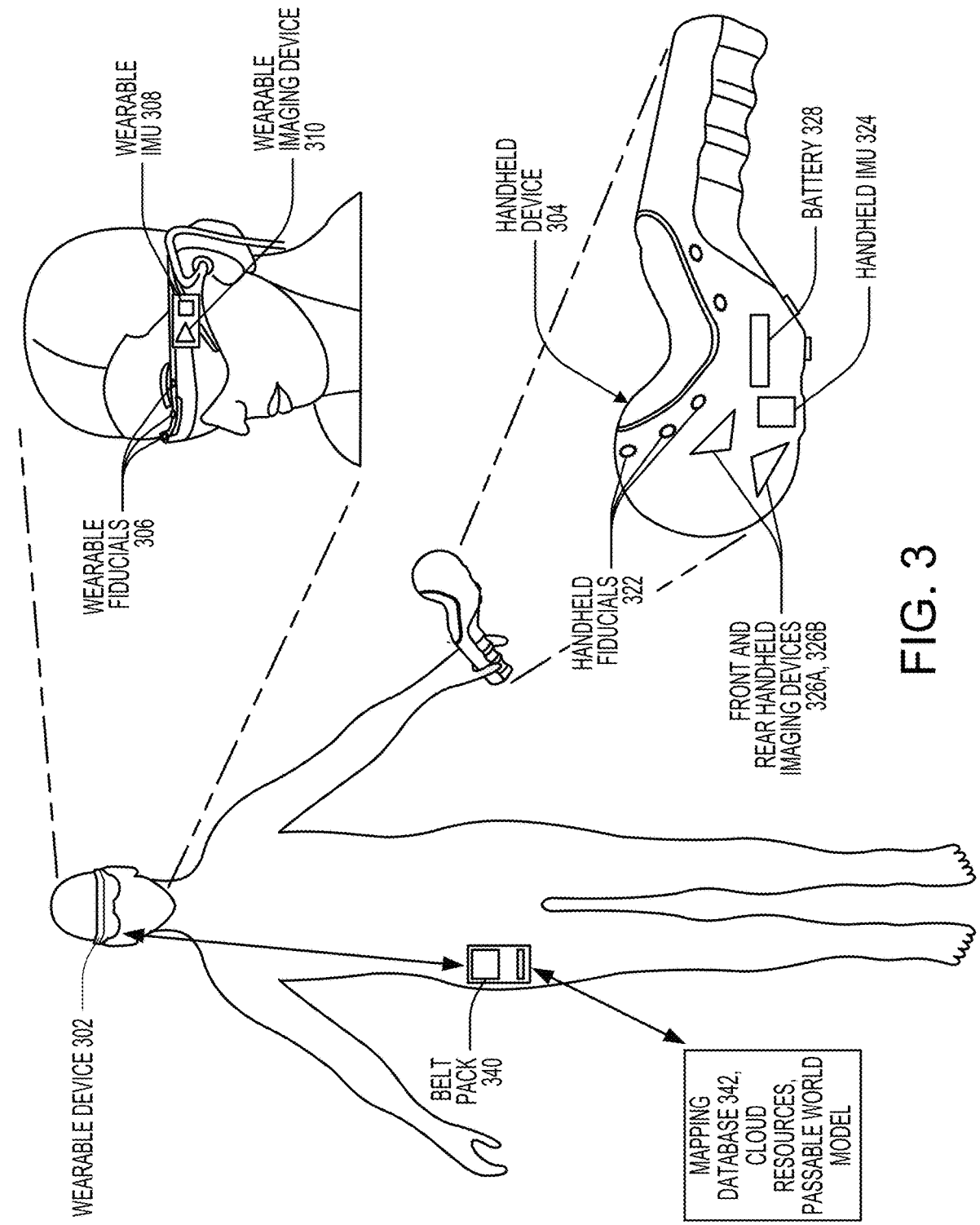
FIG. 3 illustrates an example of how a visual tracking system may be incorporated with an AR system having a wearable device and a handheld device.

FIG. 3 illustrates an example of how a visual tracking system may be incorporated into an AR system having a wearable device 302 (e.g., a head set) and a handheld device 304 (e.g., a controller). In some embodiments, handheld device 304 may be a handheld controller that allows a user to provide an input to the AR system. For example, handheld device 304 may be a totem to be used in a gaming scenario. Handheld device 304 may be a haptic device and may include one or more haptic surfaces utilizing a variety of sensor types. During operation of the AR system, a user may hold handheld device 304 in his/her left or right hand by actively gripping handheld device 304 and/or by securing an attachment mechanism (e.g., a wraparound strap) to the user's hand.

Handheld device 304 may include one or more fiducials (referred to herein as handheld fiducials 322) positioned along one or more exterior surfaces of handheld device 304 such that the fiducials may be within the field of view of an imaging device external to handheld device 304. Handheld fiducials 322 may have a known relationship with respect to each other such that an imaging device may determine its position and/or orientation with respect to handheld device 304 by capturing an image of one or more of handheld fiducials 322. Handheld fiducials 322 may be dynamic, static, electrically powered, unpowered, and may, in some embodiments, be distinguishable from each other. For example, a first fiducial may be a light-emitting diode (LED) having a first wavelength and a second fiducial may be an LED having a second wavelength. Alternatively or additionally, different fiducials may have different brightness and/or may pulsate at different frequencies (e.g., a first fiducial may pulsate at 100 Hz and a second fiducial may pulsate at 150 Hz).

Handheld device 304 may include one or more imaging devices (referred to herein as handheld imaging devices 326) positioned in a manner such that wearable device 302 and/or some feature in the surroundings of handheld device 304 is within the field of view(s) of the imaging device(s) when handheld device 304 is being held by a user. For example, a front handheld imaging device 326A may be positioned such that its field of view is oriented away from the user towards one or more features in the surroundings of handheld device 304, and a rear handheld imaging device 326B may be positioned such that its field of view is oriented towards wearable device 302. Handheld imaging devices 326 may include one or more front-facing imaging devices and/or one or more rear-facing imaging devices to create a desired cumulative field of view. In some embodiments, handheld imaging devices 326 may be optical devices such as cameras and may capture still or moving images.

Handheld device 304 may include an inertial measurement unit (IMU) (referred to herein as handheld IMU 324) that is rigidly secured within handheld device 304 such that rotational and linear movement of handheld device 304 is similarly experienced by handheld IMU 324. In some instances, handheld IMU 324 may include one or more accelerometers (e.g., three), one or more gyroscopes (e.g., three), one or more magnetometers (e.g., three), and/or digital signal processing hardware and software to convert raw measurements into processed data. For example, handheld IMU 324 may include an accelerometer, a gyroscope, and a magnetometer for each of three axes. For each axis, handheld IMU 324 may output one or more of: linear position, linear velocity, linear acceleration, rotational position, rotational velocity, and/or rotational acceleration. Alternatively or additionally, handheld IMU 324 may output raw data from which any of the above-mentioned forms of processed data may be calculated.

Handheld device 304 may comprise a rechargeable and/or replaceable battery 328 or other power supply that powers handheld fiducials 322, handheld imaging devices 326, handheld IMU 324, and any other components of handheld device 304. Although not illustrated in FIG. 3, handheld device 304 may include circuitry for enabling wireless communication with wearable device 302 and/or belt pack 340. For example, upon detecting or capturing data using handheld imaging devices 326 and handheld IMU 324, handheld device 304 may transmit raw or processed data to wearable device 302 and/or belt pack 340.

Wearable device 302 may include one or more fiducials (referred to herein as wearable fiducials 306) positioned along one or more exterior surfaces of wearable device 306 such that the fiducials may be within the field of view of rear handheld imaging device 326B. Wearable fiducials 306 may have a known relationship with respect to each other such that an imaging device may determine its position and/or orientation with respect to wearable device 306 by capturing an image of one or more of wearable fiducials 306. Wearable fiducials 306 may be dynamic, static, electrically powered, unpowered, and may, in some embodiments, be distinguishable from each other. For example, a first fiducial may be an LED having a first wavelength and a second fiducial may be an LED having a second wavelength. Alternatively or additionally, different fiducials may have different brightness and/or may pulsate at different frequencies.

Wearable device 302 may include one or more imaging devices (referred to herein as wearable imaging device 310) positioned in a manner such that handheld device 304 (specifically handheld fiducials 322) is within the field of view(s) of the imaging device(s) when handheld device 304 is being held by a user. For example, one or more wearable imaging devices 310 may be positioned front-facing on wearable device 302 above, below, and/or to the side of an optical see-through component of wearable device 302. In one embodiment, two wearable imaging devices 310 may be positioned on opposite sides of the optical see-through component of wearable device 302. In some embodiments, wearable imaging devices 310 may be optical devices such as cameras and may capture still or moving images.

Wearable device 302 may include an IMU (referred to herein as wearable IMU 308) that is rigidly secured within wearable device 302 such that rotational and linear movement of wearable device 302 is similarly experienced by wearable IMU 308. In some instances, wearable IMU 308 may include one or more accelerometers (e.g., three), one or more gyroscopes (e.g., three), one or more magnetometers (e.g., three), and/or digital signal processing hardware and software to convert raw measurements into processed data. For example, wearable IMU 308 may include an accelerometer, a gyroscope, and a magnetometer for each of three axes. For each axis, wearable IMU 308 may output one or more of: linear position, linear velocity, linear acceleration, rotational position, rotational velocity, and/or rotational acceleration. Alternatively or additionally, wearable IMU 308 may output raw data from which any of the above-mentioned forms of processed data may be calculated.

In some embodiments, the AR system may include a belt pack 340, which may include a computing apparatus (e.g., one or more processors and an associated memory) for performing a localization of handheld device 304 with respect to wearable device 302. Alternatively or additionally, the computing apparatus may reside in wearable device 302 itself, or even handheld device 304. The computing apparatus may receive (via a wired and/or wireless connection) raw or processed data from each of wearable IMU 308, wearable imaging device 310, handheld IMU 324, and handheld imaging devices 326, and may compute a geospatial position of handheld device 304 (with respect to the geospatial position of wearable device 302) and an orientation of handheld device 304 (with respect to the orientation of wearable device 302). The computing apparatus may in turn comprise a mapping database 342 (e.g., passable world model, coordinate space, etc.) to detect pose, to determine the coordinates of real objects and virtual objects, and may even connect to cloud resources and the passable world model, in one or more embodiments. In some embodiments, images captured using wearable imaging device 310 and/or handheld imaging devices 326 may be used to build a passable world model. For example, features may be detected in the captured images, and the collected data (for example sparse points) may be used for building the passable world model or environmental maps otherwise.

Figure 4:
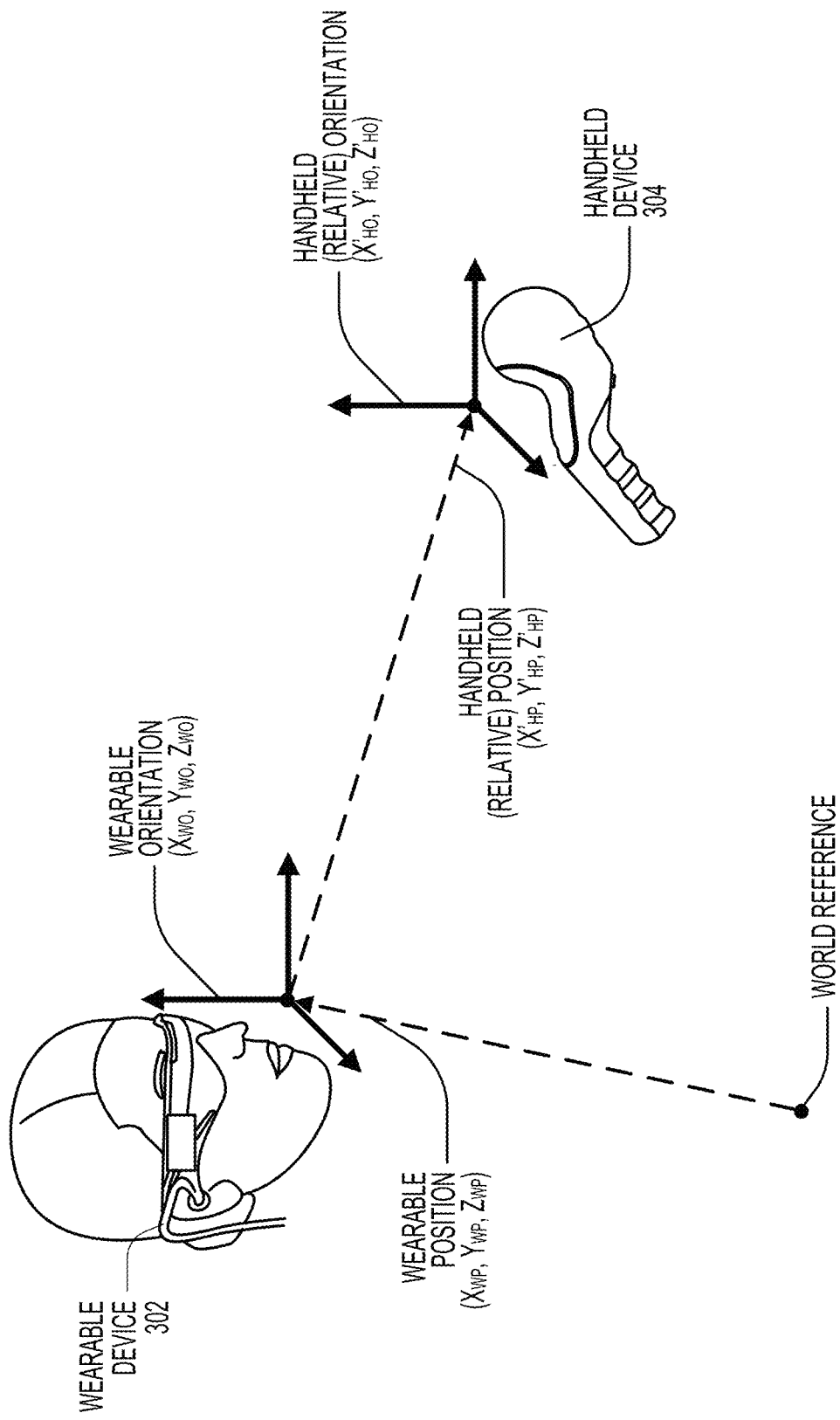
FIG. 4 illustrates a diagram of a localization task.

FIG. 4 illustrates a diagram of the localization task, as performed by the AR system, in which the position and the orientation of handheld device 304 are determined with respect to wearable device 302. In the illustrated diagram, wearable device 302 has a geospatial position ("wearable position") defined as ($X_{WP}$, $Y_{WP}$, $Z_{WP}$) with respect to a world reference and an orientation ("wearable orientation") defined as ($X_{WO}$, $Y_{WO}$, $Z_{WO}$) with respect to a world reference. In some instances, the geospatial position of wearable device 302 is expressed in longitude, latitude, and elevation values and the orientation of wearable device 302 is expressed in pitch angle, yaw angle, and roll angle values.

As illustrated, handheld device 304 has a geospatial position ("handheld position") defined as ($X'_{HP}$, $Z'_{HP}$) with respect to the geospatial position of wearable device 302 ($X_{WP}$, $Y_{WP}$, $Z_{WP}$) and an orientation ("handheld orientation") defined as ($X'_{HO}$, $Y'_{HO}$, $Z'_{HO}$) with respect to the orientation of wearable device 302 ($X_{WO}$, $Y_{WO}$, $Z_{WO}$). In some instances, the geospatial position of handheld device 304 is expressed in X, Y, and Z Cartesian values and the orientation of handheld device 304 is expressed in pitch angle, yaw angle, and roll angle values. As one specific example, when handheld device 304 is being held by a user, the geospatial position of handheld device 304 may be equal to (0.7 m, −0.5 m, 0.1 m) and the orientation of handheld device 304 may be equal to (10.2°, −46.2°, 15.2°).

Figure 5:
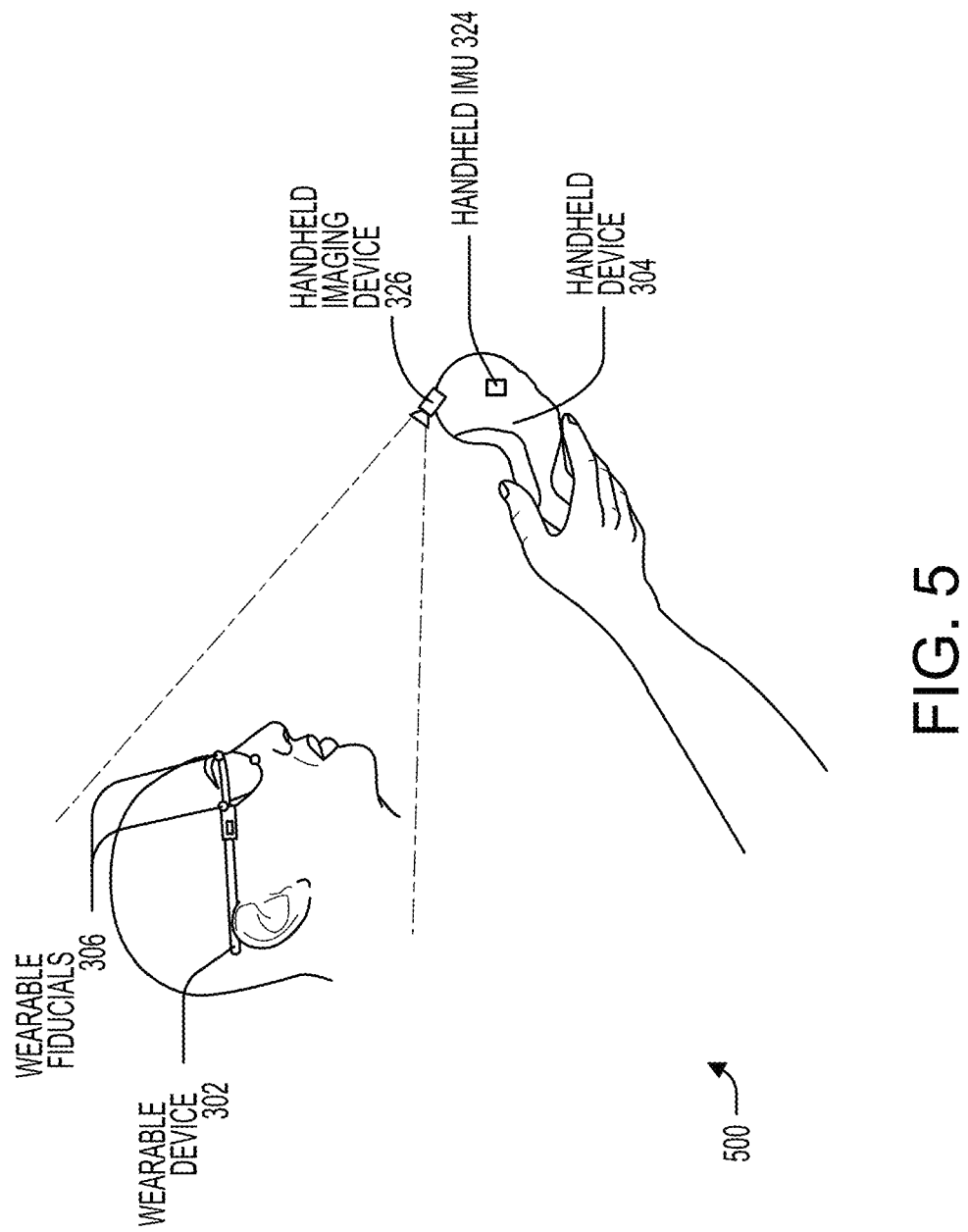
FIG. 5 illustrates an example configuration of an AR system.

FIG. 5 illustrates an example configuration of an AR system 500 in which wearable device 302 includes one or more wearable fiducials 306 and handheld device 304 includes one or more rear-facing handheld imaging devices 326 having a field of view that at least partially and at least temporarily includes wearable fiducials 306 while handheld device 304 is being held by a user in normal operation. AR system 500 may include additional sensors mounted to handheld device 304 such as handheld IMU 324. One advantage of such a configuration may be that handheld device 304 has all the data needed to perform localization of itself with respect to wearable device 302, thereby reducing the processing load on wearable device 302. AR system 500 may include additional sensors mounted to wearable device 302 such as wearable IMU 308.

Figure 6:
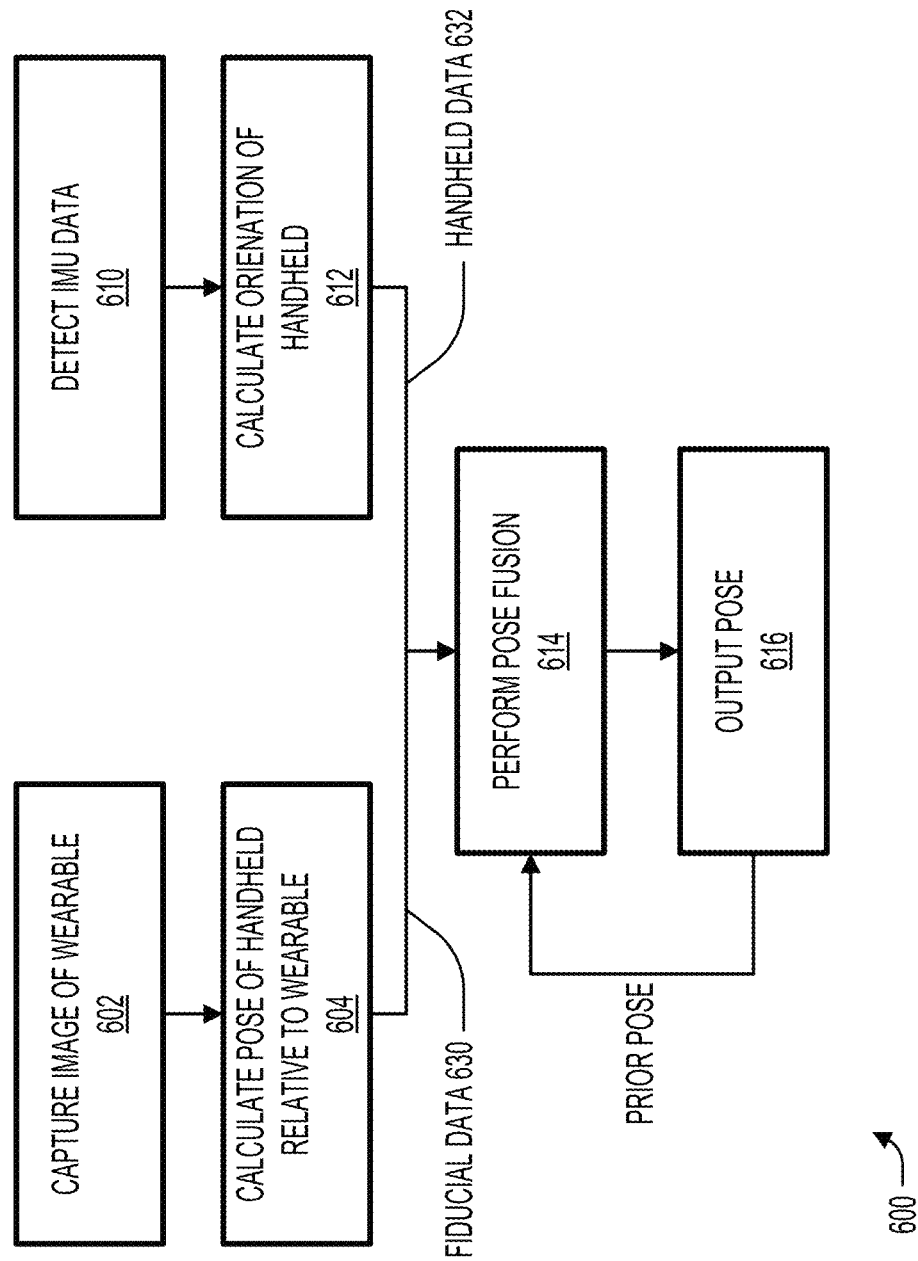
FIG. 6 illustrates a method of performing localization using the example configuration illustrated in FIG. 5.

FIG. 6 illustrates a method 600 of performing localization of handheld device 304 with respect to wearable device 302 using AR system 500. One or more steps of method 600 may be omitted or may be performed in an order different than the illustrated embodiment, and one or more steps of method 600 may be performed at one or more processing apparatus located within wearable device 302, handheld device 304, and/or belt pack 340.

At step 602, an image ("fiducial image") is captured by handheld imaging device 326. The fiducial image may contain a number of fiducials of wearable fiducials 306. For example, if there are three wearable fiducials 306, the fiducial image may be analyzed to determine that it contains zero, one, two, or three fiducials.

At step 604, a position and/or orientation of handheld device 304 with respect to wearable device 302 is calculated, for example, based on the fiducial image. For example, the fiducial image may be analyzed to determine the locations of any fiducials of wearable fiducials 306, and the position and/or orientation may be determined based on the locations of the fiducial(s) within the fiducial image as well as the known physical relationship between wearable fiducials 306. The position and/or orientation of handheld device 304 may be used to determine a pose of handheld device 304 with respect to wearable device 302. The output of step 604 is referred to as fiducial data 630.

At step 610, data ("IMU data") indicative of at least rotational movement of handheld device 304 with respect to the world (and/or with respect to wearable device 302) is detected by handheld IMU 324. The IMU data may include rotational velocities or raw data from which rotational velocities may be calculated. In some embodiments, the IMU data is also indicative of linear movement of handheld device 304, and may include linear accelerations or raw data from which linear accelerations may be calculated.

At step 612, the position and/or orientation of handheld device 304 is calculated based on the IMU data. In some embodiments, the position and/or orientation of handheld device 304 with respect to the world is calculated (using previous known and/or estimated orientations with respect to the world) and/or, in some other embodiments, the position and/or orientation of handheld device 304 with respect to wearable device 302 is calculated (using previous known and/or estimated orientations with respect to wearable device 302).

At step 614, the position and/or orientation of handheld device 304 with respect to wearable device 302 is calculated based on fiducial data 630 and/or handheld data 632. Fiducial data 630 may include the fiducial image and/or the position and/or orientation calculations based on the fiducial image performed in step 604. Handheld data 632 may include the IMU data and/or the position and/or orientation calculations based on the IMU data performed in step 612. The position and orientation calculation at step 614 may be performed in accordance with one of various operating states based on the number of fiducials found in the fiducial image. Each operating state may treat fiducial data 630 and handheld data 632 differently and may place greater emphasis on one type of data with respect to the other type of data. The operating states are described in further detail in reference to FIG. 13.

At step 616, the position and/or orientation of handheld device 304 with respect to wearable device 302 is outputted, for example, to an external device and/or process for use in operating AR system 500. For example, the position and/or orientation may be outputted to AR system 500 for generating and displaying virtual content.

Figure 7:
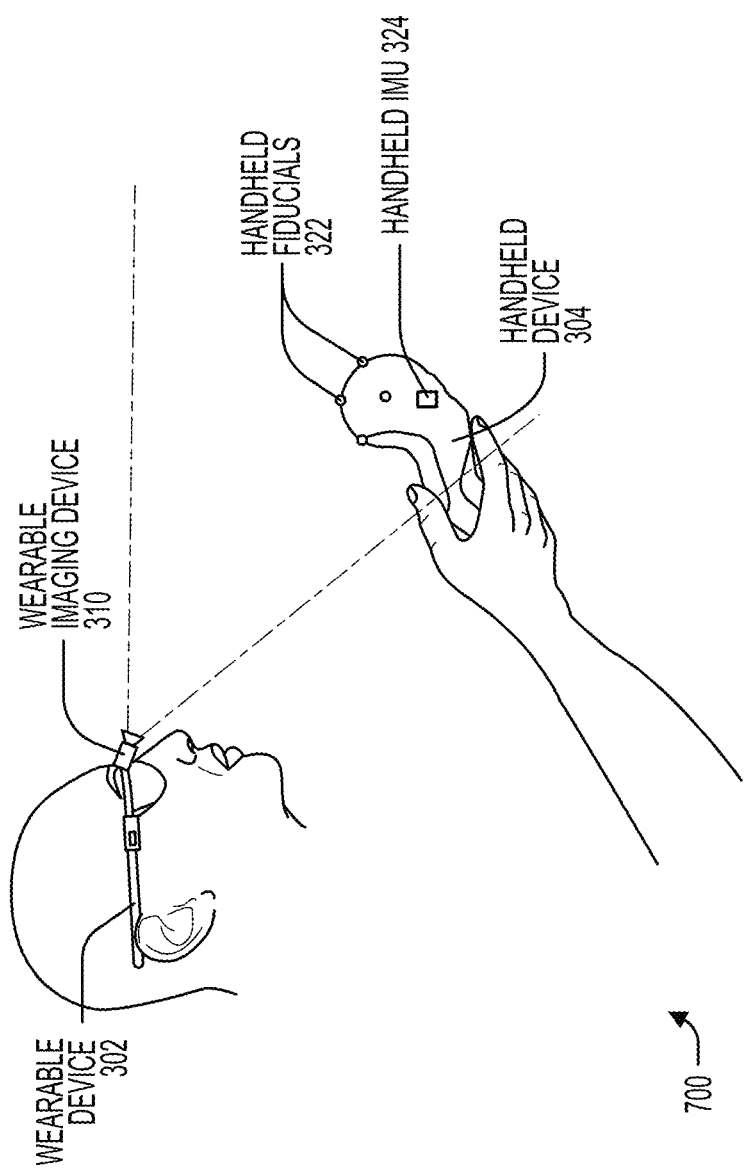
FIG. 7 illustrates an example configuration of an AR system.

FIG. 7 illustrates an example configuration of an AR system 700 in which wearable device 302 includes one or more wearable imaging devices 310 having a field of view that at least partially and at least temporarily includes handheld fiducials 322 while handheld device 304 is being held by a user in normal operation, and handheld device 304 includes one or more handheld fiducials 322. AR system 700 may include additional sensors mounted to handheld device 304 such as handheld IMU 324. One advantage of such a configuration may be the simplicity and low-power consumption of handheld device 304. AR system 700 may include additional sensors mounted to wearable device 302 such as wearable IMU 308.

Figure 8:
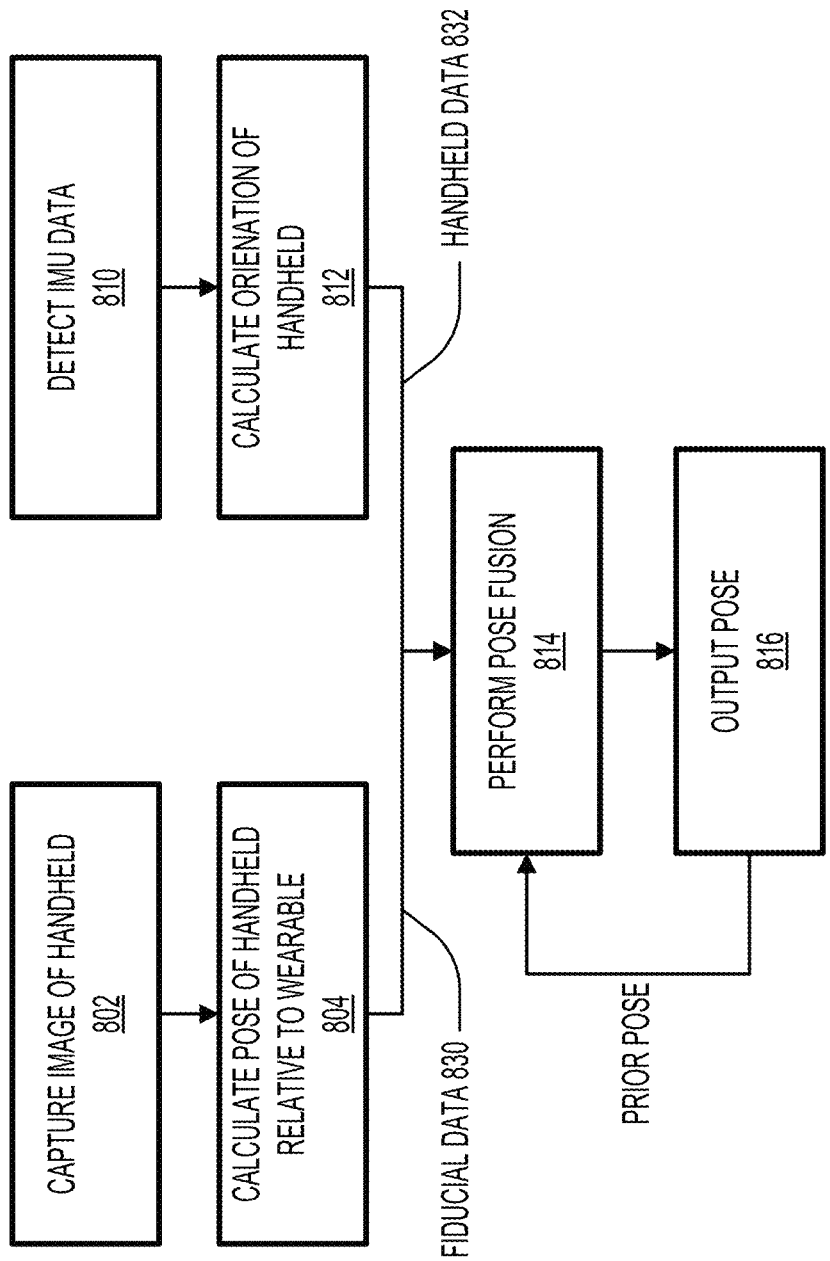
FIG. 8 illustrates a method of performing localization using the example configuration illustrated in FIG. 7.

FIG. 8 illustrates a method 800 of performing localization of handheld device 304 with respect to wearable device 302 using AR system 700. One or more steps of method 800 may be omitted or may be performed in an order different than the illustrated embodiment, and one or more steps of method 800 may be performed at one or more processing apparatus located within wearable device 302, handheld device 304, and/or belt pack 340.

At step 802, an image ("fiducial image") is captured by wearable imaging device 310. The fiducial image may contain a number of fiducials of handheld fiducials 322. For example, if there are three handheld fiducials 322, the fiducial image may be analyzed to determine that it contains zero, one, two, or three fiducials.

At step 804, a position and/or orientation of handheld device 304 with respect to wearable device 302 is calculated, for example, based on the fiducial image. For example, the fiducial image may be analyzed to determine the locations of any fiducials of handheld fiducials 322, and the position and/or orientation may be determined based on the locations of the fiducial(s) within the fiducial image as well as the known physical relationship between handheld fiducials 322. The position and/or orientation of handheld device 304 may be used to determine a pose of handheld device 304 with respect to wearable device 302. The output of step 804 is referred to as fiducial data 830.

At step 810, data ("IMU data") indicative of at least rotational movement of handheld device 304 with respect to the world is detected by handheld IMU 324. The IMU data may include rotational velocities or raw data from which rotational velocities may be calculated. In some embodiments, the IMU data is also indicative of linear movement of handheld device 304, and may include linear accelerations or raw data from which linear accelerations may be calculated.

At step 812, the position and/or orientation of handheld device 304 is calculated based on the IMU data. In some embodiments, the position and/or orientation of handheld device 304 with respect to the world is calculated (using previous known and/or estimated orientations with respect to the world) and/or, in some embodiments, the position and/or orientation of handheld device 304 with respect to wearable device 302 is calculated (using previous known and/or estimated orientations with respect to wearable device 302). The output of step 812 may be referred to as handheld data 832.

At step 814, the position and/or orientation of handheld device 304 with respect to wearable device 302 is calculated based on fiducial data 830 and/or handheld data 832. Fiducial data 830 may include the fiducial image and/or the position and/or orientation calculations based on the fiducial image performed in step 804. Handheld data 832 may include the IMU data and/or the position and/or orientation calculations based on the IMU data performed in step 812. The position and/or orientation calculation at step 814 may be performed in accordance with one of various operating states based on the number of fiducials found in the fiducial image. Each operating state may treat fiducial data 830 and handheld data 832 differently and may place greater emphasis on one type of data with respect to the other type of data. The operating states are described in further detail in reference to FIG. 13.

At step 816, the position and/or orientation of handheld device 304 with respect to wearable device 302 is outputted, for example, to an external device and/or process for use in operating AR system 700. For example, the position and/or orientation may be outputted to AR system 700 for generating and displaying virtual content.

Figure 9:
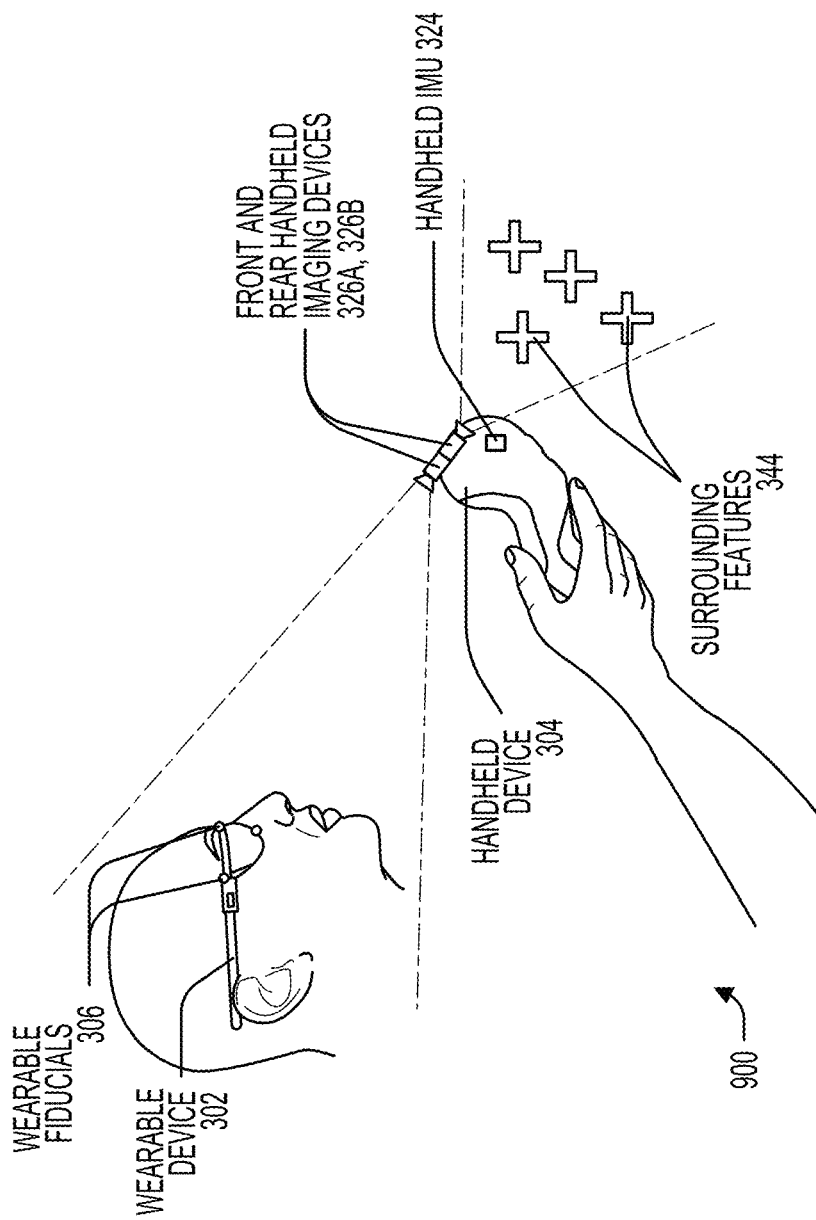
FIG. 9 illustrates an example configuration of an AR system.

FIG. 9 illustrates an example configuration of an AR system 900 in which handheld device 326 includes front handheld imaging device 326A having a field of view that at least partially and at least temporarily includes one or more surrounding features 344 while handheld device 304 is being held by a user and rear handheld imaging device 326B having a field of view that at least partially and at least temporarily includes one or more wearable fiducials 306 while handheld device 304 is being held by a user in normal operation. In the example configuration, multiple wearable fiducials 322 are affixed to wearable device 302. AR system 900 may include additional sensors mounted to handheld device 304 such as handheld IMU 324. One advantage of such a configuration may be the increased accuracy provided by the multiple imaging devices. AR system 900 may include additional sensors mounted to wearable device 302 such as wearable IMU 308.

Figure 10:
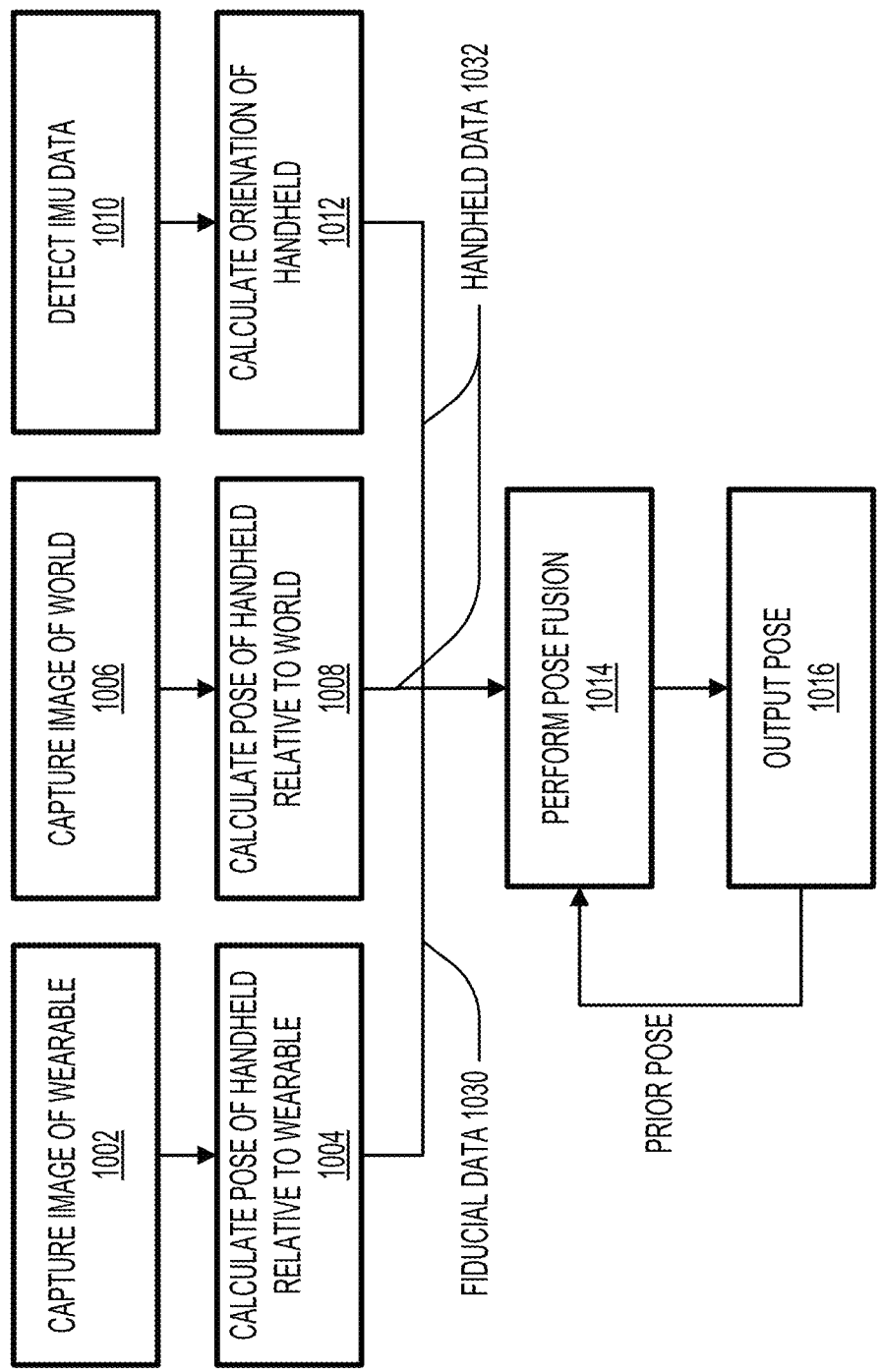
FIG. 10 illustrates a method of performing localization using the example configuration illustrated in FIG. 9.

FIG. 10 illustrates a method 1000 of performing localization of handheld device 304 with respect to wearable device 302 using AR system 900. One or more steps of method 1000 may be omitted or may be performed in an order different than the illustrated embodiment, and one or more steps of method 1000 may be performed at one or more processing apparatus located within wearable device 302, handheld device 304, and/or belt pack 340.

At step 1002, an image ("fiducial image") is captured by rear handheld imaging device 326B. The fiducial image may contain a number of fiducials of wearable fiducials 306. For example, if there are three wearable fiducials 306, the fiducial image may be analyzed to determine that it contains zero, one, two, or three fiducials.

At step 1004, the position and/or orientation of handheld device 304 with respect to wearable device 302 is calculated based on, for example, the fiducial image. For example, the fiducial image may be analyzed to determine the locations of any fiducials of wearable fiducials 306, and the position and/or orientation may be determined based on the locations of the fiducial(s) within the fiducial image as well as the known physical relationship between wearable fiducials 306. The position and/or orientation of handheld device 304 may be used to determine a pose of handheld device 304 with respect to wearable device 302. The output of step 1004 is referred to as fiducial data 1030.

At step 1006, an image ("world image") is captured by front handheld imaging device 326A. The world image may contain surrounding features 344.

At step 1008, the position and/or orientation of handheld device 304 with respect to the world is calculated based on the world image. In some instances, the world image is compared to previous world images to estimate the movement of handheld device 304 using visual odometry techniques, which may include performing feature detection in each of the world images to establish correspondence between the world images. The movement vector of handheld device 304 that is most consistent with the movement of the detected features in the world images may then be calculated. The output of step 1008 is referred to as handheld data 1032.

At step 1010, data ("IMU data") indicative of at least rotational movement of handheld device 304 with respect to the world is detected by handheld IMU 324. The IMU data may include rotational velocities or raw data from which rotational velocities may be calculated. In some embodiments, the IMU data is also indicative of linear movement of handheld device 304, and may include linear accelerations or raw data from which linear accelerations may be calculated.

At step 1012, the position and/or orientation of handheld device 304 is calculated based on the IMU data. In some embodiments, the position and/or orientation of handheld device 304 with respect to the world is calculated (using previous known and/or estimated orientations with respect to the world) and/or, in some embodiments, the position and/or orientation of handheld device 304 with respect to wearable device 302 is calculated (using previous known and/or estimated orientations with respect to wearable device 302). The output of step 1012 is referred to as handheld data 1032.

At step 1014, the position and/or orientation of handheld device 304 with respect to wearable device 302 is calculated based on fiducial data 1030 and/or handheld data 1032. Fiducial data 1030 may include the fiducial image and/or the position and/or orientation calculations based on the fiducial image performed in step 1004. Handheld data 1032 may include the world image, the position and/or orientation calculations based on the world image performed in step 1008, the IMU data, and/or the position and orientation calculations based on the IMU data performed in step 1012. The position and/or orientation calculation at step 1014 may be performed in accordance with one of various operating states based on the number of fiducials found in the fiducial image. Each operating state may treat fiducial data 1030 and handheld data 1032 differently and may place greater emphasis on one type of data with respect to the other type of data. The operating states are described in further detail in reference to FIG. 13.

At step 1016, the position and/or orientation of handheld device 304 with respect to wearable device 302 is outputted, for example, to an external device and/or process for use in operating AR system 900. For example, the position and/or orientation may be outputted to AR system 900 for generating and displaying virtual content.

Figure 11A:
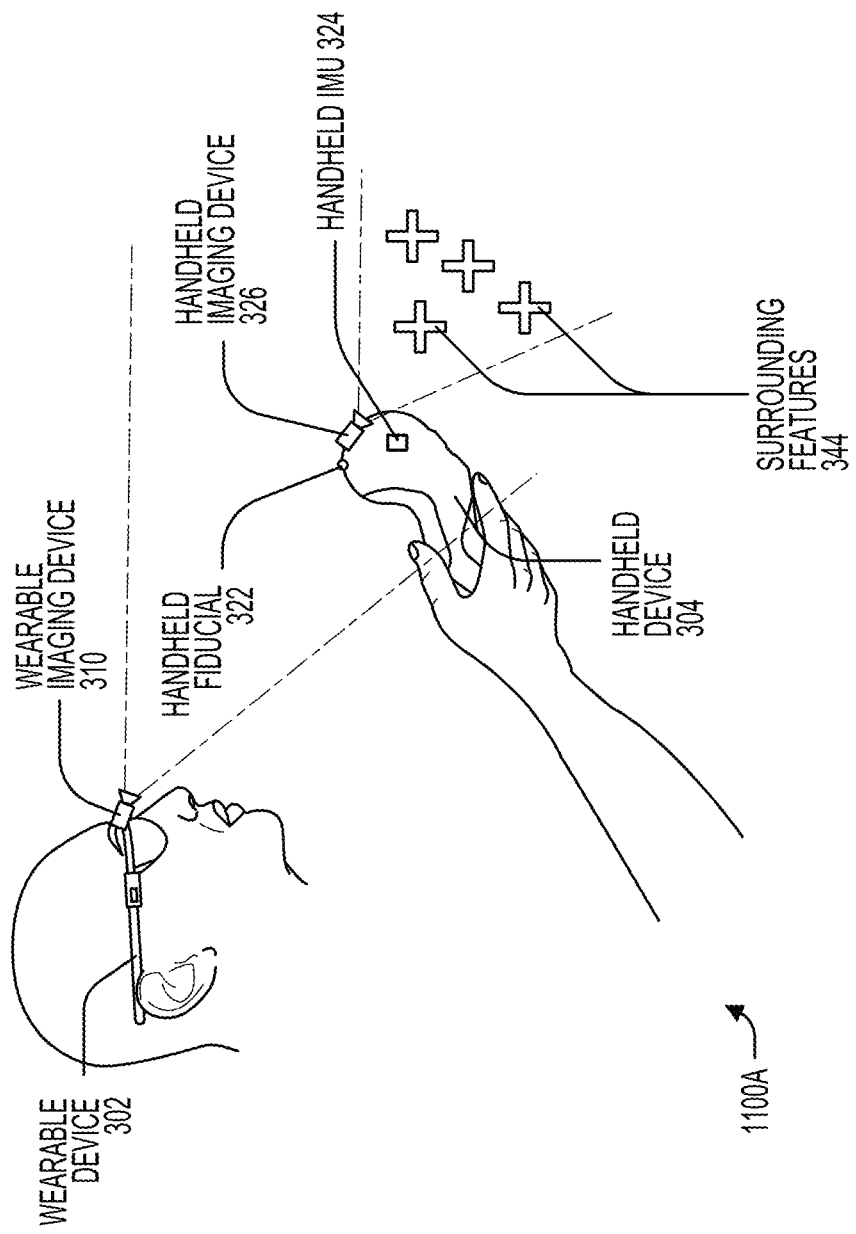
FIG. 11A illustrates an example configuration of an AR system.

FIG. 11A illustrates an example configuration of an AR system 1100A in which wearable device 302 includes one or more wearable imaging devices 310 having a field of view that at least partially and at least temporarily includes handheld fiducials 322 while handheld device 304 is being held by a user in normal operations, and in which handheld device 304 includes one or more handheld imaging devices 326 having a field of view that at least partially and at least temporarily includes one or more surrounding features 344 while handheld device 304 is being held by a user in normal operation. In the example configuration illustrated in FIG. 11A, a single handheld fiducial 322 is affixed to handheld device 304. AR system 1100 may include additional sensors mounted to handheld device 304 such as handheld IMU 324. Advantages of the configuration illustrated in FIG. 11A include the increased accuracy provided by the multiple imaging devices as well as the computational efficiency of calculating position and orientation while constrained by a single fiducial location. AR system 1100A may include additional sensors mounted to wearable device 302 such as wearable IMU 308.

Figure 11B:
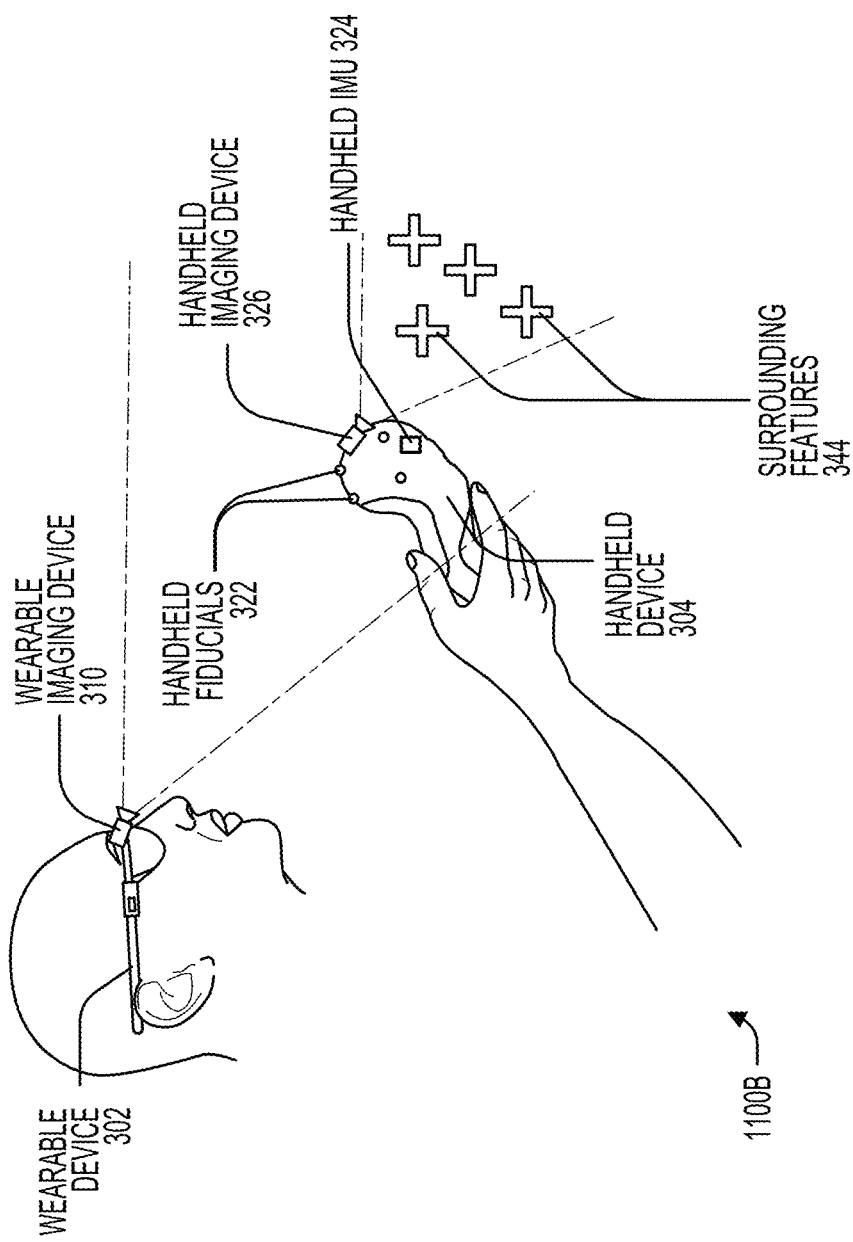
FIG. 11B illustrates an example configuration of an AR system.

FIG. 11B illustrates an example configuration of an AR system 1100B in which wearable device 302 includes one or more wearable imaging devices 310 having a field of view that at least partially and at least temporarily includes handheld fiducials 322 while handheld device 304 is being held by a user in normal operation, and in which handheld device 304 includes one or more handheld imaging devices 326 having a field of view that at least partially and at least temporarily includes one or more surrounding features 344 while handheld device 304 is being held by a user in normal operation. In the example configuration illustrated in FIG. 11B, multiple handheld fiducials 322 are affixed to handheld device 304. AR system 1100B may include additional sensors mounted to handheld device 304 such as handheld IMU 324. Advantages of such a configuration include the increased accuracy provided by the multiple imaging devices as well as the increased robustness by combining fiducial-based tracking with visual odometry techniques. AR system 1100B may include additional sensors mounted to wearable device 302 such as a IMU.

Figure 12:
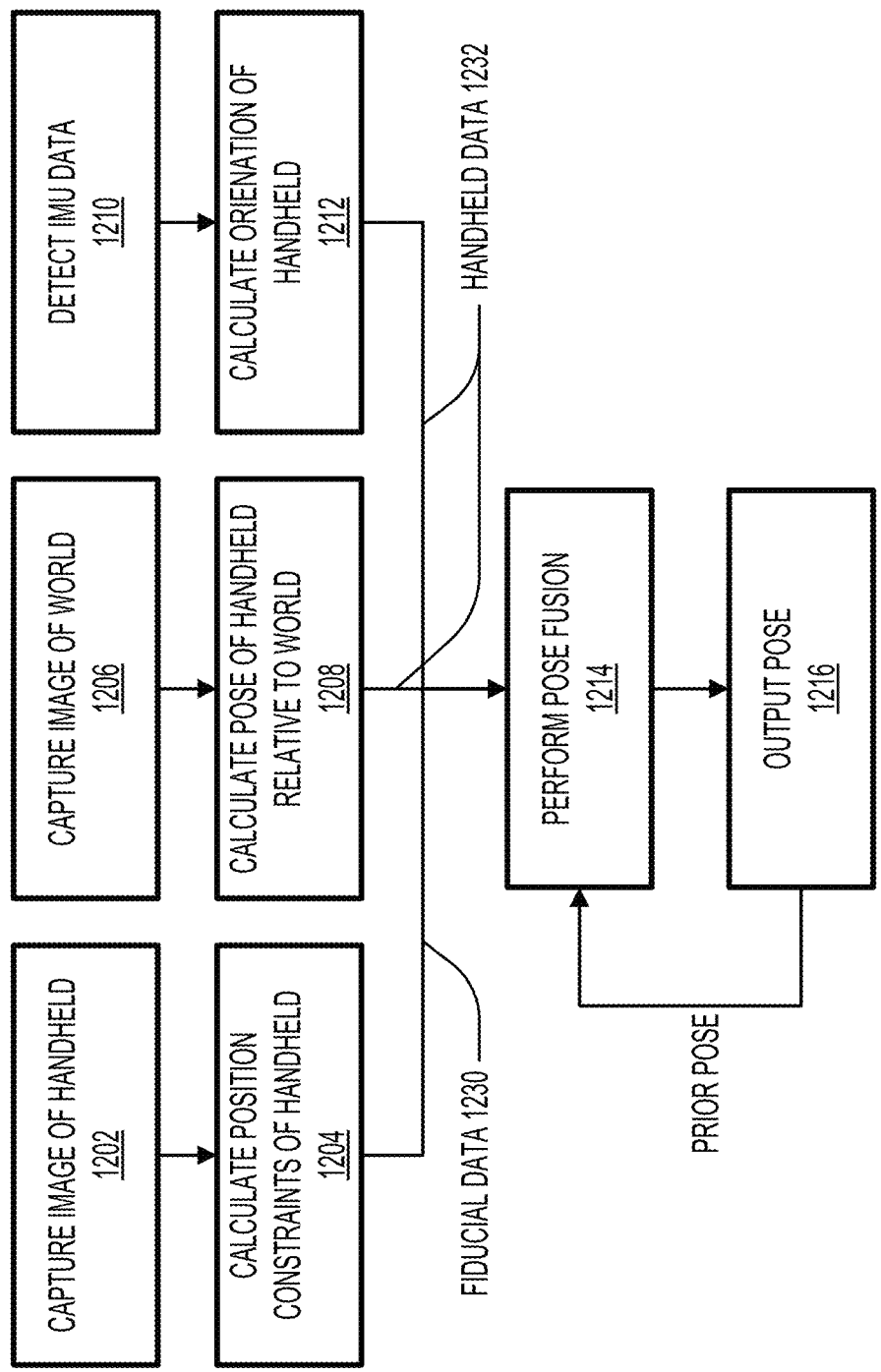
FIG. 12 illustrates a method of performing localization using the example configurations illustrated in FIGS. 11A and 11B.

FIG. 12 illustrates a method 1200 of performing localization of handheld device 304 with respect to wearable device 302 using AR system 1100A of FIG. 11A or AR system 1100B of FIG. 11B. One or more steps of method 1200 may be omitted or may be performed in an order different than the illustrated embodiment, and one or more steps of method 1200 may be performed at one or more processing apparatus located within wearable device 302, handheld device 304, and/or belt pack 340.

At step 1202, an image ("fiducial image") is captured by wearable imaging device 310. The fiducial image may contain a number of handheld fiducials 322. For example, with respect to FIG. 11A, if there is one handheld fiducial 322, the fiducial image may be analyzed to determine that it contains zero or one fiducial. For example, with respect to FIG. 11B, if there are three handheld fiducials 322, the fiducial image may be analyzed to determine that it contains zero, one, two, or three fiducials.

At step 1204, the position and/or orientation of handheld device 304 with respect to wearable device 302 is calculated, for example, based on the fiducial image. For example, with respect to FIG. 11A, the fiducial image may be analyzed to determine the location of the fiducial, and a constraint for the position and/or orientation may be determined based on the location of the fiducial within the fiducial image. For example, with respect to FIG. 11B, the fiducial image may be analyzed to determine the locations of any fiducials, and the position and/or orientation may be determined based on the locations of the fiducial(s) within the fiducial image as well as the known physical relationship between wearable fiducials 306.

At step 1206, an image ("world image") is captured by handheld imaging device 326. The world image may contain surrounding features 344.

At step 1208, the position and/or orientation of handheld device 304 with respect to the world is calculated based on the world image. In some instances, the world image is compared to previous world images to estimate the movement of handheld device 304 using visual odometry techniques, which may include performing feature detection in each of the world images to establish correspondence between the world images. The movement vector of handheld device 304 that is most consistent with the movement of the detected features in the world images may then be calculated. The output of step 1208 is referred to as handheld data 1232.

At step 1210, data ("IMU data") indicative of at least rotational movement of handheld device 304 with respect to the world is detected by handheld IMU 324. The IMU data may include rotational velocities or raw data from which rotational velocities may be calculated. In some embodiments, the IMU data is also indicative of linear movement of handheld device 304, and may include linear accelerations or raw data from which linear accelerations may be calculated.

At step 1212, the position and/or orientation of handheld device 304 is calculated based on the IMU data. In some embodiments, the position and/or orientation of handheld device 304 with respect to the world is calculated (using previous known and/or estimated orientations with respect to the world) and/or, in some embodiments, the position and/or orientation of handheld device 304 with respect to wearable device 302 is calculated (using known and/or estimated orientations with respect to wearable device 302). The output of step 1212 is referred to as handheld data 1232.

At step 1214, the position and/or orientation of handheld device 304 with respect to wearable device 302 is calculated based on fiducial data 1230 and/or handheld data 1232. For example, with respect to FIG. 11A, fiducial data 1230 may include the fiducial image and/or the constraint for the position and/or orientation calculation based on the fiducial image performed in step 1204. For example, with respect to FIG. 11B, fiducial data 1230 may include the fiducial image and/or the position and/or orientation calculations based on the fiducial image performed in step 1204. Handheld data 1232 may include the world image, the position and/or orientation calculations based on the world image performed in step 1208, the IMU data, and/or the position and/or orientation calculations based on the IMU data performed in step 1212. The position and/or orientation calculation at step 1214 may be performed in accordance with one of various operating states based on the number of fiducials found in the fiducial image. Each operating state may treat fiducial data 1230 and handheld data 1232 differently and may place greater emphasis on one type of data with respect to the other type of data. The operating states are described in further detail in reference to FIG. 13.

At step 1216, the position and/or orientation of handheld device 304 with respect to wearable device 302 is outputted, for example, to an external device and/or process for use in operating AR systems 1100. For example, the position and/or orientation may be outputted to AR systems 1100 for generating and displaying virtual content.

Figure 13:
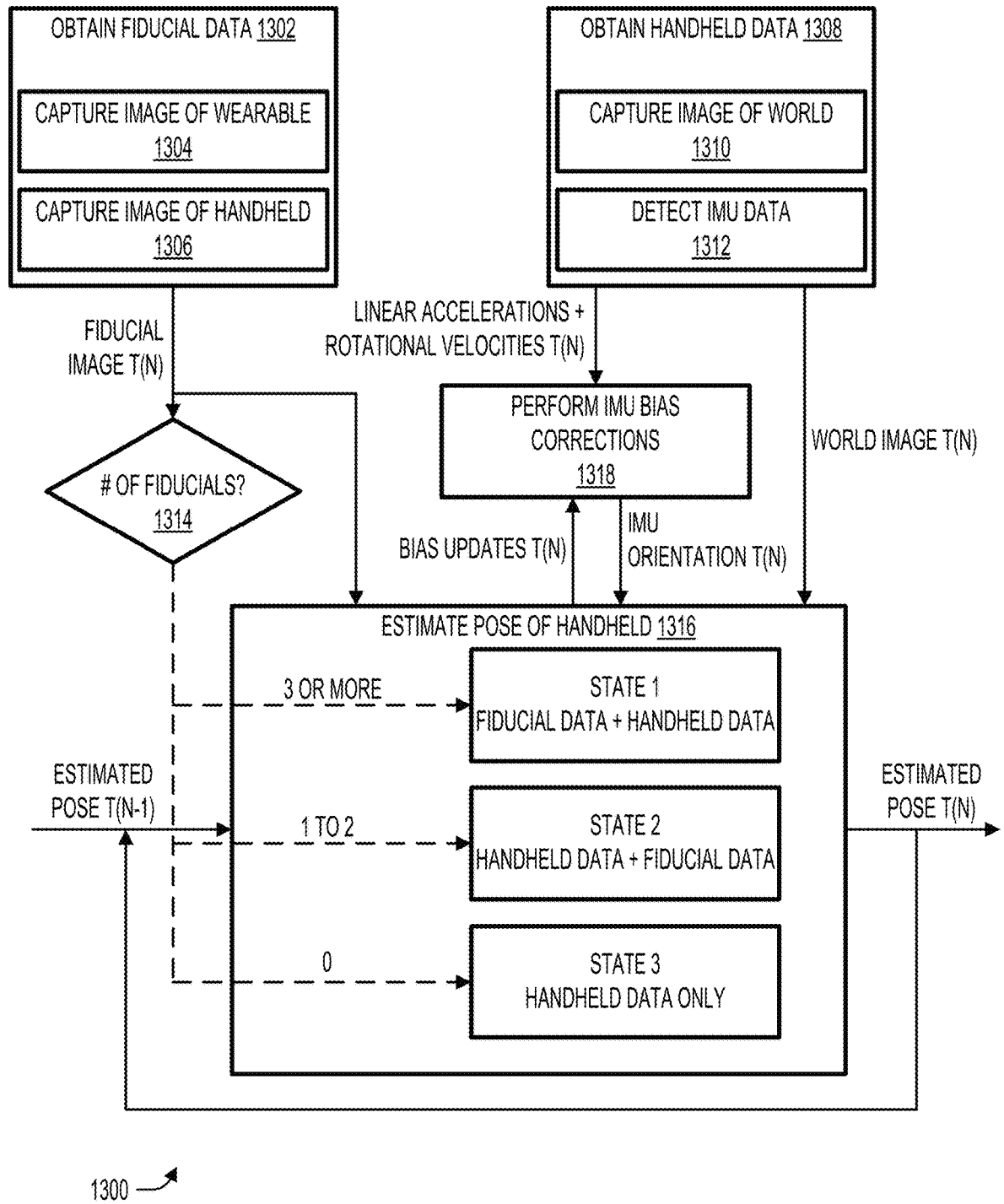
FIG. 13 illustrates a method of performing localization using any of the previously illustrated example configurations.

FIG. 13 illustrates a method 1300 of performing localization of handheld device 304 with respect to wearable device 302 using any one of AR systems 500, 700, 900, 1100 or any combination thereof. One or more steps of method 1300 may be omitted or may be performed in an order different than the illustrated embodiment, and one or more steps of method 1300 may be performed at one or more processing apparatus located within wearable device 302, handheld device 304, and/or belt pack 340.

At step 1302, data ("fiducial data") indicative of movement of handheld device 304 with respect to wearable device 302 is obtained using an imaging device. Performing step 1302 may including performing one or both of steps 1304, 1306. At step 1304, an image ("fiducial image") containing a number of wearable fiducials 306 is captured by rear handheld imaging device 326B. At step 1306, an image ("fiducial image") containing a number of handheld fiducials 322 is captured by wearable imaging device 310.

At step 1308, data ("handheld data") indicative of at least rotational movement of handheld device 304 with respect to the world is detected. Performing step 1308 may include performing one or both of steps 1310, 1312.

At step 1310, an image ("world image") is captured by front handheld imaging device 326A containing surrounding features 344. At step 1312, data ("IMU data") indicative of at least rotational movement of handheld device 304 with respect to the world is detected by handheld IMU 324. The IMU data may include rotational velocities or raw data from which rotational velocities may be calculated. In some embodiments, the IMU data is also indicative of linear movement of handheld device 304, and may include linear accelerations or raw data from which linear accelerations may be calculated.

At step 1314, the number of fiducials contained in the fiducial image is determined as well as the locations (e.g., pixel locations) of the observed fiducials.

At step 1316, the position and/or orientation of handheld device 304 with respect to wearable device 302 is calculated/estimated/updated in accordance with one of three operating states. An operating state is selected based on the number of fiducials that are observed in the fiducial image. In the illustrated embodiment, the first operating state ("State 1") is selected when three or more fiducials are observed in the fiducial image, the second operating state ("State 2") is selected when one or two fiducials are observed in the fiducial image, and the third operating state ("State 3") is selected when zero fiducials are observed in the fiducial image. Switching between states may occur each time a new fiducial image is captured or at predetermined intervals. For example, step 1316 may be performed at each camera frame based on one or both of the fiducial data (e.g., the fiducial image) and the handheld data (e.g., the world image and the IMU orientation). Step 1316 may further incorporate previous position and/or orientation calculations to improve estimation accuracy.

In accordance with the first operating state ("State 1"), the position and/or orientation may be calculated (in full six degrees of freedom) with high accuracy, for example, based solely on the fiducial data. When four or more fiducials are observed, the position can be completely solved for. When exactly three fiducials are observed, two possible solutions to the position exist, one of which can be discarded based on additional processing and/or comparisons to previously calculated positions. In some embodiments, the handheld data may be used to supplement and improve the calculation accuracy. In some embodiments, an extended Kalman filter may be employed to improve accuracy based on previous position and/or orientation calculations.

In accordance with the second operating state ("State 2"), the position and/or orientation may be calculated, for example, using both the fiducial data and the handheld data. When two fiducials are observed, the fiducial data enables a constrained position and/or orientation to be calculated, and the handheld data may be used to complete the calculation under the constraint imposed by the fiducial data. In some embodiments, an extended Kalman filter may be employed to improve accuracy based on previous position and/or orientation calculations. Calculations performed under the second operating state may overall be less accurate than calculations performed under the first operating state.

In accordance with the third operating state ("State 3"), the position and orientation may be calculated, for example, based solely on the handheld data (i.e., dead reckoning). In some embodiments, an extended Kalman filter may be employed to improve accuracy based on previous position and/or orientation calculations. Calculations performed under the third operating state may overall be less accurate than calculations performed under the first or second operating states.

At step 1318, IMU bias corrections are performed to increase the accuracy of the IMU data provided as inputs at step 1316. Because the IMU data may drift over time, periodic updates can recalibrate the IMU data. In some embodiments, bias updates are only provided when the first operating state is selected and high-accuracy bias updates can be provided. In some embodiments, bias updates are provided when either the first operating state or the second operating state is selected, as both states utilize fiducial data in their calculations. Bias updates can be provided at each camera frame or at predetermined intervals.

Figure 14:
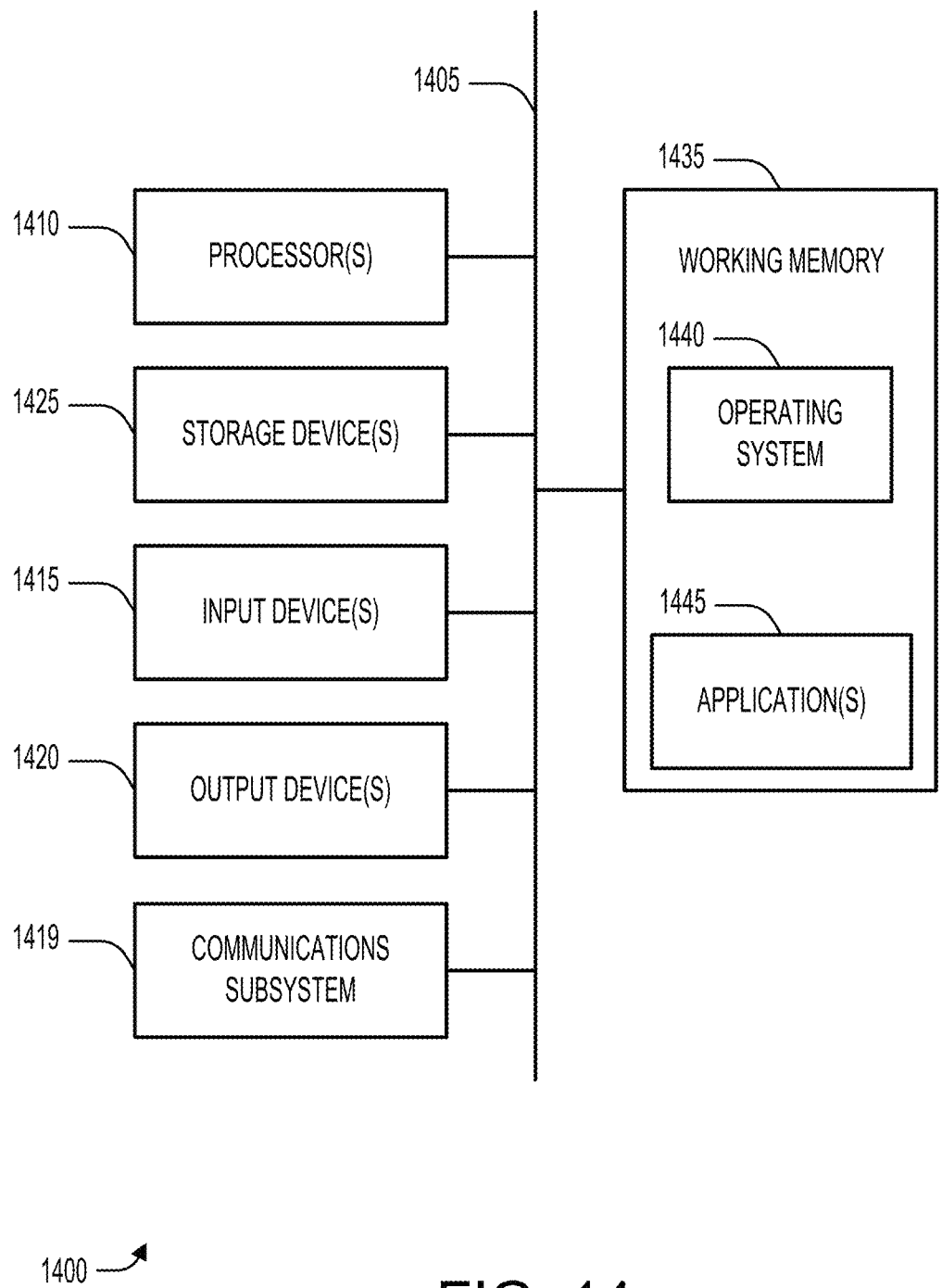
FIG. 14 illustrates a simplified computer system according to some embodiments described herein.

FIG. 14 illustrates a simplified computer system 1400 according to some embodiments described herein. FIG. 14 provides a schematic illustration of one example of computer system 1400 that can perform some or all of the steps of the methods provided by various embodiments. It should be noted that FIG. 14 is meant only to provide a generalized illustration of various components, any or all of which may be utilized as appropriate. FIG. 14, therefore, broadly illustrates how individual system elements may be implemented in a relatively separated or relatively more integrated manner.

Computer system 1400 is shown comprising hardware elements that can be electrically coupled via a bus 1405, or may otherwise be in communication, as appropriate. The hardware elements may include one or more processors 1410, including without limitation one or more general-purpose processors and/or one or more special-purpose processors such as digital signal processing chips, graphics acceleration processors, and/or the like; one or more input devices 1415, which can include without limitation a mouse, a keyboard, a camera, and/or the like; and one or more output devices 1420, which can include without limitation a display device, a printer, and/or the like.

Computer system 1400 may further include and/or be in communication with one or more non-transitory storage devices 1425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1400 might also include a communications subsystem 1419, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1419 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1419. In other embodiments, a portable electronic device, e.g. the first electronic device, may be incorporated into computer system 1400, e.g., an electronic device as an input device 1415. In some embodiments, computer system 1400 will further comprise a working memory 1435, which can include a RAM or ROM device, as described above.

Computer system 1400 also can include software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1425 described above. In some cases, the storage medium might be incorporated within a computer system, such as computer system 1400. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1400 and/or might take the form of source and/or installable code, which, upon compilation and/or installation on computer system 1400 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1400 to perform methods in accordance with various embodiments of the technology. According to a set of embodiments, some or all of the procedures of such methods are performed by computer system 1400 in response to processor 1410 executing one or more sequences of one or more instructions, which might be incorporated into the operating system 1440 and/or other code, such as an application program 1445, contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In embodiments implemented using computer system 1400, various computer-readable media might be involved in providing instructions/code to processor(s) 1410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1425. Volatile media include, without limitation, dynamic memory, such as the working memory 1435.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1400.

The communications subsystem 1419 and/or components thereof generally will receive signals, and the bus 1405 then might carry the signals and/or the data, instructions, etc. carried by the signals to the working memory 1435, from which the processor(s) 1410 retrieves and executes the instructions. The instructions received by the working memory 1435 may optionally be stored on a non-transitory storage device 1425 either before or after execution by the processor(s) 1410.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of performing localization of a handheld device with respect to a wearable device, the method comprising:
    obtaining, by a wearable imaging device mounted on the wearable device, fiducial data indicative of movement of the handheld device, wherein obtaining the fiducial data includes capturing, by the wearable imaging device, a fiducial image containing a number of light-emitting fiducials affixed to the handheld device, wherein the number of light-emitting fiducials is sufficient to determine a position and an orientation of the handheld device in full six degrees of freedom based solely on the fiducial data;
    capturing, by a sensor on the handheld device, handheld data;
    capturing, by a sensor on the wearable device, wearable device data indicative of movement of the wearable device; and
    updating the position and the orientation of the handheld device using the wearable device data, the fiducial data, and the handheld data.

2. The method of claim 1 wherein the sensor on the handheld device comprises an inertial measurement unit (IMU).

3. The method of claim 1 wherein updating the position and the orientation of the handheld device is in accordance with a first operating state or a second operating state.

4. The method of claim 3, further comprising:
    determining the number of light-emitting fiducials contained in the fiducial image;
    in response to determining that the number of light-emitting fiducials is equal to or greater than three, updating at least one of the position and the orientation of the handheld device based on the fiducial data in accordance with the first operating state; and
    in response to determining that the number of light-emitting fiducials is equal to one or two, updating at least one of the position and the orientation of the handheld device based on the fiducial data and the handheld data in accordance with the second operating state.

5. The method of claim 4, further comprising in response to determining that the number of light-emitting fiducials is equal to zero, updating at least one of the position and the orientation of the handheld device based on the handheld data in accordance with a third operating state.

6. The method of claim 5 wherein:
at least one of the position and the orientation of the handheld device is updated based solely on the fiducial data in accordance with the first operating state; and
at least one of the position and the orientation of the handheld device is updated based solely on the handheld data in accordance with the third operating state.

7. The method of claim 1 wherein the number of light-emitting fiducials comprises a number of light-emitted diodes (LEDs).

8. The method of claim 1 wherein:
the sensor on the handheld device comprises a second imaging device; and
obtaining the handheld data includes capturing, by the second imaging device, a world image containing one or more features surrounding the handheld device.

9. An augmented reality (AR) system, the system comprising:
a wearable device comprising an imaging device and a wearable sensor mounted on the wearable device, wherein the wearable sensor is operable to capture wearable device data indicative of movement of the wearable device;
a handheld device comprising a handheld sensor and handheld light-emitting fiducials affixed to the handheld device, wherein:
the imaging device is operable to capture a fiducial image containing a number of the handheld light-emitting fiducials, wherein the number of light-emitting fiducials is sufficient to determine a position and an orientation of the handheld device in full six degrees of freedom based solely on the fiducial data, wherein the handheld sensor is operable to capture handheld data; and
a computing apparatus configured to perform localization of the handheld device with respect to the wearable device using the wearable device data, the fiducial image, and the handheld data.

10. The AR system of claim 9 wherein the wearable sensor comprises an inertial measurement unit (IMU).

11. The AR system of claim 9 wherein the handheld sensor comprises an inertial measurement unit (IMU).

12. The AR system of claim 9 wherein the handheld sensor comprises a second imaging device.

13. The AR system of claim 12, wherein the second imaging device is operable to capture a world image containing one or more surrounding features.

14. The AR system of claim 9, wherein the handheld device further comprises a second handheld sensor, wherein the handheld sensor comprises an inertial measurement unit (IMU) and the second handheld sensor comprises a second imaging device.

15. The AR system of claim 9, further comprising a belt pack, wherein the computing apparatus is disposed in the belt pack.

16. The AR system of claim 9, wherein the computing apparatus is disposed in the wearable device or the handheld device.

17. The AR system of claim 9 wherein the handheld light-emitting fiducials comprises a number of light-emitting diodes (LEDs).

* * * * *